United States Patent Office 3,751,420
Patented Aug. 7, 1973

3,751,420
MONOOLMONOENE AMINES
Frederick P. Hauck, Somerville, Joseph E. Sundeen, Trenton, and Joyce A. Reid, Highland Park, N.J., assignors to E. R. Squibb & Sons, Inc., New York, N.Y.
No Drawing. Filed Apr. 1, 1971, Ser. No. 130,437
Int. Cl. C07d 29/16
U.S. Cl. 260—293.56
6 Claims

ABSTRACT OF THE DISCLOSURE

Monoolmonoene amines are provided having the structure

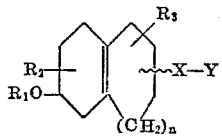

which are useful as analgetic muscle relaxants.

COMPOUND OF THE INVENTION

The present invention relates to monoolmonone amines having the structure

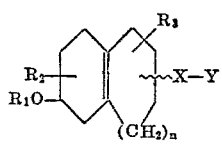

wherein $n$ is 0, 1, 2 or 3, $R_1$ is hydrogen, acyl, lower alkyl, halo-lower alkyl, lower alkoxycarbonyl

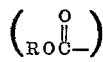

amido

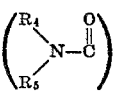

or lower alkoxyalkylene, $R_2$ can be hydrogen, lower alkyl, acyloxy, lower alkoxy, cycloalkyl, aryl, alkaryl, or monocyclic heterocyclic containing two or three double bonds, and $R_3$ can be hydrogen, lower alkyl or cycloalkyl X is a single bond or a straight or branched chain bivalent aliphatic radical and Y is

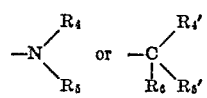

$R_6$ represents hydrogen or a lower alkyl, arylalkyl, or lower alkoxy; $R_4$ and $R_5$ may be the same or different, representing hydrogen, lower alkyl, lower alkoxy, halo-lower alkyl, monocyclic cycloalkyl-lower alkyl, lower alkanoyl, halo-lower alkanoyl, hydroxy-lower alkyl, monocyclic aryloyl, monocyclic aryl, monocyclic aryl-lower alkyl, monocyclic heterocyclic, monocyclic heterocyclic alkyl or N,N-dialkyl sulfamyl; $R_4'$ and $R_5'$ can be any of the $R_4$ and $R_5$ radicals as well as a heterocycle such as pyridine, quinoline, or isoquinoline.

The

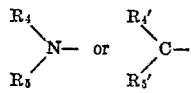

group may also form a heterocyclic radical.

X represents straight or branched chain bivalent aliphatic hydrocarbon groups having from zero to about ten carbon atoms, such as an alkylene group of the structure $(CH_2)_{n'}$ wherein $n'$ is zero to ten, such as methylene, ethylene, propylene, trimethylene, butylene, dimethylethylene, and the like. Furthermore, X can correspond to any of the lower alkyl groups exemplified hereinafter; $R_1$, and/or $R_4$ and $R_5$ may be an acyl radical of a hydrocarbon carboxylic acid of less than twelve carbon atoms, which may be exemplified by the lower alkanoic acids, (e.g., formic, acetic, propionic, butyric, valeric, trimethyl acetic and caproic acids), the lower alkenoic acids (e.g., acrylic, methacrylic, crotonic, 3-butenoic and senecioic acids), the monocyclic aryl-carboxylic acids (e.g., benzoic and toluic acids), the monocyclic aryl-lower alkanoic acids [e.g., phenacetic, β-phenylpropionic, α-phenylbutyric, and 5-(p-methylphenyl)pentanoic acids], the cycloalkyl carboxylic acids (e.g., cyclobutane carboxylic acid, cyclopentane carboxylic acid and cyclohexane carboxylic acid), the cycloalkenyl carboxylic acids (e.g., 2-cyclobutene carboxylic acid and 3-cyclopentene carboxylic acid), the cycloalkyl and cycloalkenyl-lower alkanoic acids [e.g., cyclohexaneacetic, α-cyclopentanebutyric, 2-cyclopenteneacetic and 3 - (3-cyclohexene) pentenoic acid], and the like.

The alkanoic acids may include halogen substituents, for example, trifluoroacetic acid. In addition, other acyl groups which can be employed are angeloyl, veratroyl, vanilloyl, erythro - 2-hydroxy-2-methyl-3-acetoxybutyryl, (1) - 2 - methylbutyryl; (d)-2-hydroxy-2-methylbutyryl; (d)-threo-2,3-dihydroxy-2-methylbutyryl and (1)-erythro-2,3-dihydroxy-2-methylbutyryl.

The term "lower alkyl" as employed herein includes both straight and branched chain radicals of up to eight carbon atoms, for instance, methyl, ethyl, propyl, isopropyl, butyl, t-butyl, isobutyl, pentyl, hexyl ,isohexyl, heptyl, 4,4 - dimethylpentyl, octyl, 2,2,4-trimethylpentyl and the like.

Alkyl radicals substituted by F, Br, Cl or I are encompassed by the term halo-lower alkyl. Trifluoromethyl is a preferred halo-lower alkyl radical.

The term "lower alkoxy" includes straight and branched chain radicals which correspond to the above lower alkyl groups attached to an oxygen atom.

The term "monocyclic aryl" as employed herein contemplates monocyclic carbocyclic aryl radicals, for instance, phenyl and substituted phenyl radicals, such as lower alkyl phenyl (e.g., o-, m- or p-tolyl, ethylphenyl, butylphenyl, and the like). di(lower alkyl)phenyl (e.g., 2,4-dimethylphenyl, 3,5-diethylphenyl, and the like), halophenyl (e.g., chlorophenyl, bromophenyl, iodophenyl, fluorophenyl), o-, m- or p-nitrophenyl, dinitrophenyl, (e.g., 3,5-dinitrophenyl, 2,6-dinitrophenyl, and the like), trinitrophenyl (e.g., picryl), as well as alkoxyphenyl compounds.

The term "monocyclic aryoyl" includes any of the above aryl groups linked to a carbonyl group.

The term "monocyclic cycloalkyl" and "monocyclic cycloalkenyl" includes cyclic radicals containing from 3 to 6 ring members (e.g., cyclopropyl, cyclobutyl, cyclopentyl, cyclohexyl, cyclobutenyl and cyclohexenyl).

As indicated hereinbefore,

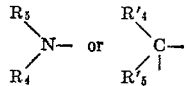

may form a heterocyclic radical. The symbols $R_4$ and $R_5$ and $R_4'$ and $R_5'$ may together represent the carbon (and hydrogen) and the oxygen, sulfur or nitrogen atoms which, with the nitrogen or carbon atoms in the above group, form a 5-, 6- or 7-membered nitrogen heterocyclic containing not more than one hetero atom in addition to the nitrogen already shown in the group and less than 21 atoms in the radical (excluding hydrogen). The heterocyclic radicals may include one to three substituents including lower alkoxy or lower alkyl as defined hereinafter; trihalomethoxy, such as trifluoromethoxy; trihalomethylmercapto, such as trifluoromethylmercapto; N,N-dialkylsulfamoyl groups, such as N,N-dimethylsulfamoyl; lower alkanoyl groups as defined hereinafter such as acetyl, propionyl, and the like; hydroxy; hydroxy-lower alkyl, such as hydroxymethyl, 2-hydroxyethyl, or the like; hydroxy-lower alkoxy-lower alkyl, such as 2-(2-hydroxyethoxy)ethyl, or the like; alkanoyloxy containing an alkanoyl as defined herein; alkanoyloxy-lower alkyl (up to about 14 carbons in the alkanoyl group), such as 2-heptanoyloxyethyl; carbo-lower alkoxy, such as carbomethoxy, carboethoxy, carbopropoxy, or the like; or 2-(alkanoyloxy-lower alkoxy) lower alkyl (with up to about 14 carbons in the alkanoyl group), such as 2-(decanoyloxyethoxy)-ethyl, or the like.

Illustrative of the heterocyclic radicals represented by $R_4$, $R_5$,

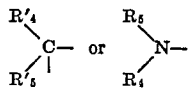

are the following: piperidino; (lower alkyl)piperidino [e.g., 2-, 3-, or 4-(lower alkyl)piperidino or 4-(N-lower alkyl)piperidino such as 2-(ethyl)piperidino or 4-(N-isopropyl)-piperidino]; di(lower alkyl)-piperidino [e.g., 2,4-, 2,5- or 3,5-di(lower alkyl)piperidino such as 2,4-dimethylpiperidino or 2,5-di-t-butyl piperidino]; (lower alkoxy)piperidino [e.g., 2-methoxypiperidino or 3-methoxypiperidino]; hydroxypiperidino [e.g., 3-hydroxy- or 4-hydroxypiperidino]; aminomethylpiperidino [e.g., 4-aminomethylpiperidino]; pyrrolidino; (lower alkyl)pyrrolidino [e.g., 3-methylpyrrolidino]; di(lower alkyl)pyrrolidino [e.g., 3,4-dimethylpyrrolidino]; (lower alkoxy) pyrrolidino [e.g., 2-methoxypyrrolidino]; morpholino; (lower alkyl)morpholino [e.g., 3-methylmorpholino]; di(lower alkyl) morpholino [e.g., 3,5-dimethylmorpholino]; (lower alkoxy)morpholino [e.g. 2-methoxymorpholino]; thiamorpholino; (lower alkyl)thiamorpholino [e.g., 3-methylthiamorpholino]; di(lower alkyl)thiamorpholino [e.g., 3,5-dimethylthiamorpholino; (lower alkoxy)thiamorpholino] [e.g., 3-methoxythiamorpholino]; piperazino; (lower alkyl)piperazino [e.g., $N^4$-methylpiperazino]; di(lower alkyl)-piperazino [e.g., 2,5-dimethylpiperazino or 2,6-dimethylpiperazino]; (lower alkoxy) piperazino [e.g., 2-methoxypiperazino]; (hydroxy-lower alkyl)piperazino [e.g., $N^4$-(2-hydroxyethyl)piperazino]; (alkanoyloxy-lower alkyl)piperazino wherein the alkanoyloxy group has up to 14 carbons [e.g., $N^4$-(2-heptanoyloxyethyl)piperazino or $N^4$ - (2 - dodecanoyloxyethyl)-piperazino]; (hydroxy-lower alkoxy-lower alkyl) piperazino [e.g., (hydroxy-methoxy-methyl)piperazino]; (carbo-lower alkoxy)piperazino [e.g., $N^4$-(carbomethoxy-, carboethoxy-, or carbopropoxy)piperazino]; homopiperazino; or $N^4$-(hydroxylower alkyl)homopiperazino [e.g., $N^4$-(2-hydroxyethyl)homopiperazino]; piperidyl; (lower alkyl)piperidyl [e.g., 1-, 2-, 3- or 4-(lower alkyl) piperidyl, such as 1-N-methylpiperidyl or 3-ethylpiperidyl]; di(lower alkyl)piperidyl [e.g., 2,4-, 2,5-, or 3,5-di(lower alkyl)piperidyl wherein lower alkyl is methyl, ethyl, n-propyl, isopropyl, etc.]; lower alkoxy piperidyl [e.g., 3-methoxypiperidyl or 2-ethoxypiperidyl]; hydroxy piperidyl [e.g., 3-hydroxy- or 4-hydroxypiperidyl]; aminomethylpiperidyl [e.g., 4-aminoethylpiperidyl]; pyrrolidyl; lower alkyl pyrrolidyl [e.g., 1-N-methylpyrrolidyl]; di(lower alkyl)pyrrolidyl [e.g., 2,3-dimethylpyrrolidyl]; lower alkoxy pyrrolidyl [e.g., 4-N-methoxypyrrolidyl]; morpholinyl; (lower alkyl)morpholinyl [e.g., 3-methylmorpholinyl]; di(lower alkyl)morpholinyl [e.g., 3-methyl-4-N-ethylmorpholinyl]; (lower alkoxy)morpholinyl [e.g., 2-ethoxymorpholinyl]; thiamorpholinyl; (lower alkyl) thiamorpholinyl [e.g., 3-ethylthiamorpholinyl]; di(lower alkyl)thiamorpholinyl [e.g., 3-ethylthiamorpholinyl]; di (lower alkyl)thiamorpholinyl [e.g., 3-methyl-4-N-ethylthiamorpholinyl]; lower alkoxy thiamorpholino [e.g., 3-methoxythiamorpholinyl]; piperazinyl; alkyl, dialkyl, alkoxy or hydroxy-lower alkyl substituted piperazinyl.

The N-oxides of the compounds of Formula I where Y represents a nitrogen containing heterocyclic radical can be formed by reacting such Formula I compounds with a peracid such as m-chloroperoxy benzoic acid, perbenzoic acid or monoperphthalic acid in a suitable solvent such as chloroform.

The compounds of Formula I form acid addition salts by reaction with various inorganic and organic acids. These salts frequently provide convenient means for separating the production from the reaction mixture in which it is produced or from the solvent in which it is extracted in view of their insolubility in various media. Thus the product may be precipitated in the form of an insoluble salt and converted, by conventional techniques, to the free base or to another soluble or insoluble salt as desired.

Illustrative salts include the hydrohalides, such as hydrochloride, hydrobromide and hydroiodide, especially the first two, other mineral acid salts such as phosphate, sulfate, nitrate, etc., organic acid salts such as oxalate, tartrate, malate, maleate, citrate, pamoate, fumarate, camphorsulfonate, methanesulfonate, benzenesulfonate, toluenesulfonate, salicylate, benzoate, ascorbate, mandelate, or the like.

The compounds of Formula I also form quaternary ammonium salts with lower alkyl halides, for example, methyl bromide, ethyl bromide and propyl iodide; benzyl halides, such as benzyl chloride; and dilower alkyl sulfates, such as dimethyl sulfate. To form the quaternary ammonium salts, the free base initially formed is intereacted with at least one equivalent of the desired alkylating agent.

Formula I includes all stereoisomers and mixtures thereof. Thus, Formula I includes compounds of the structure (II)

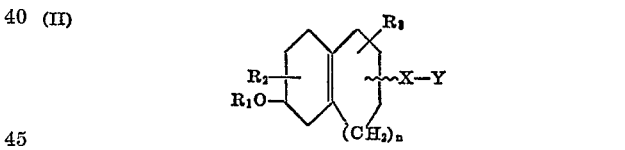

wherein $R_1O$ and —X—Y are in trans configuration and (III)

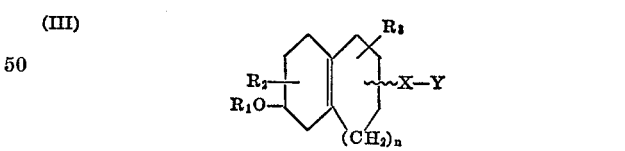

wherein $R_1O$ and —X—Y are in cis configuration.

In each of the formulae set out herein, the wavy line (∼) before X—Y indicates that X—Y can be up or down.

Examples of monoolmonoene amines falling within the present invention include, but are not limited to, the following:

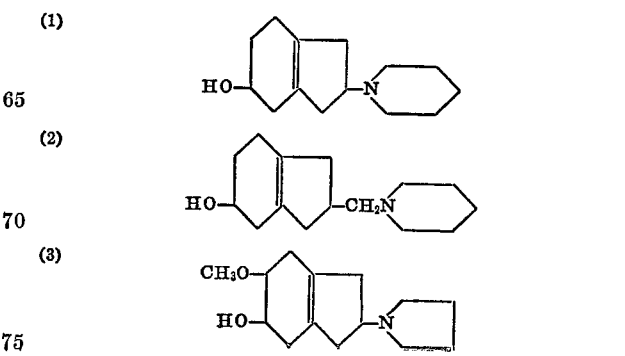

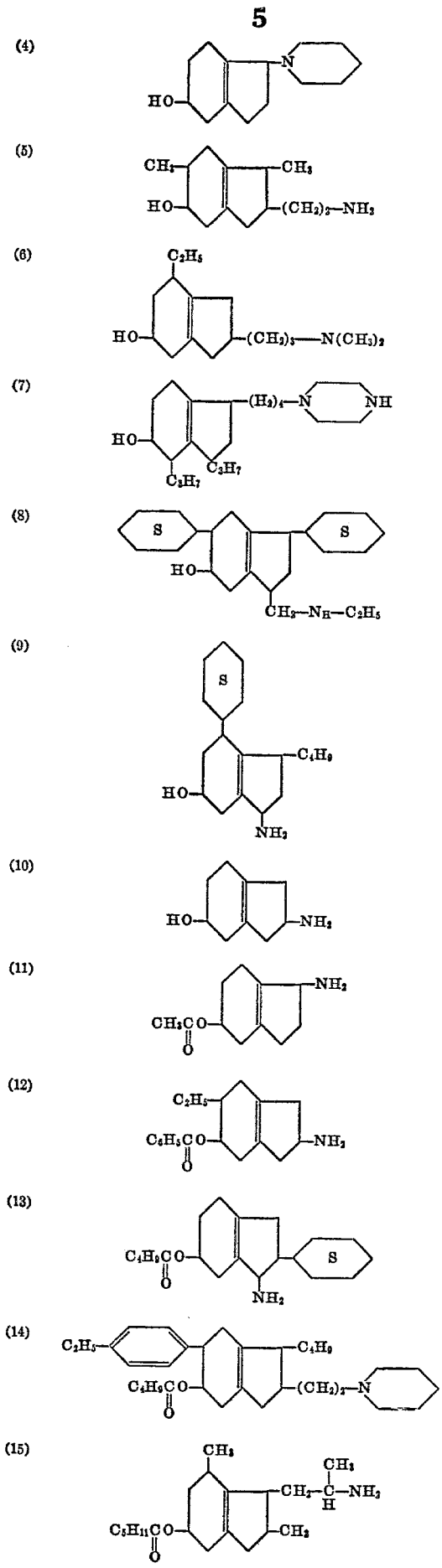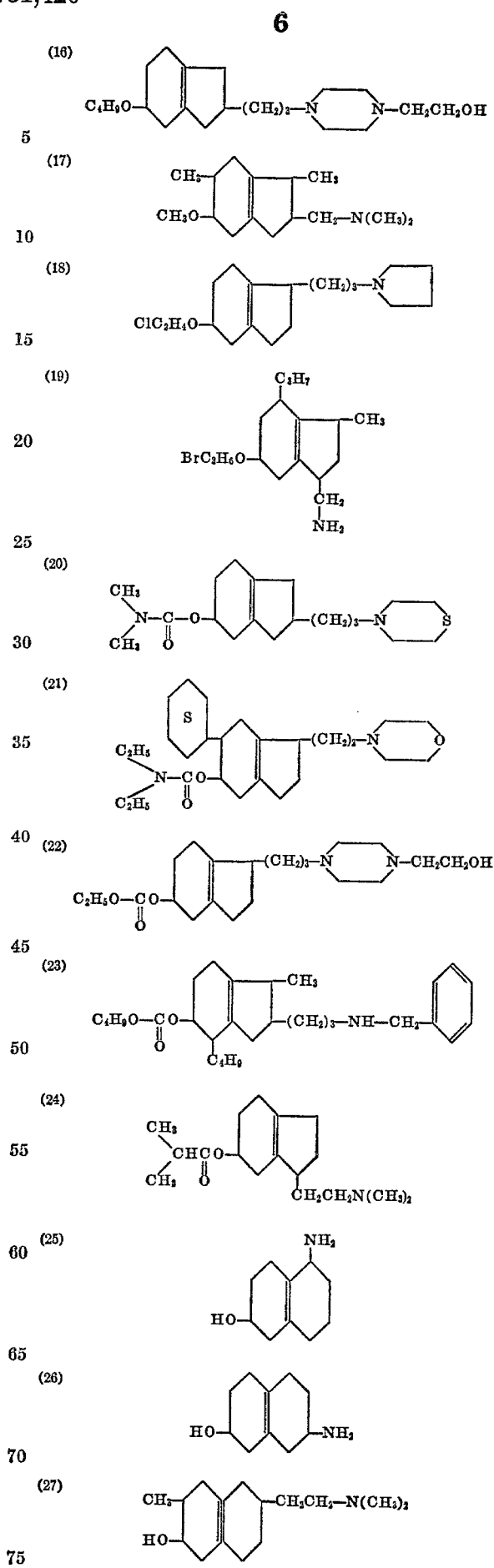

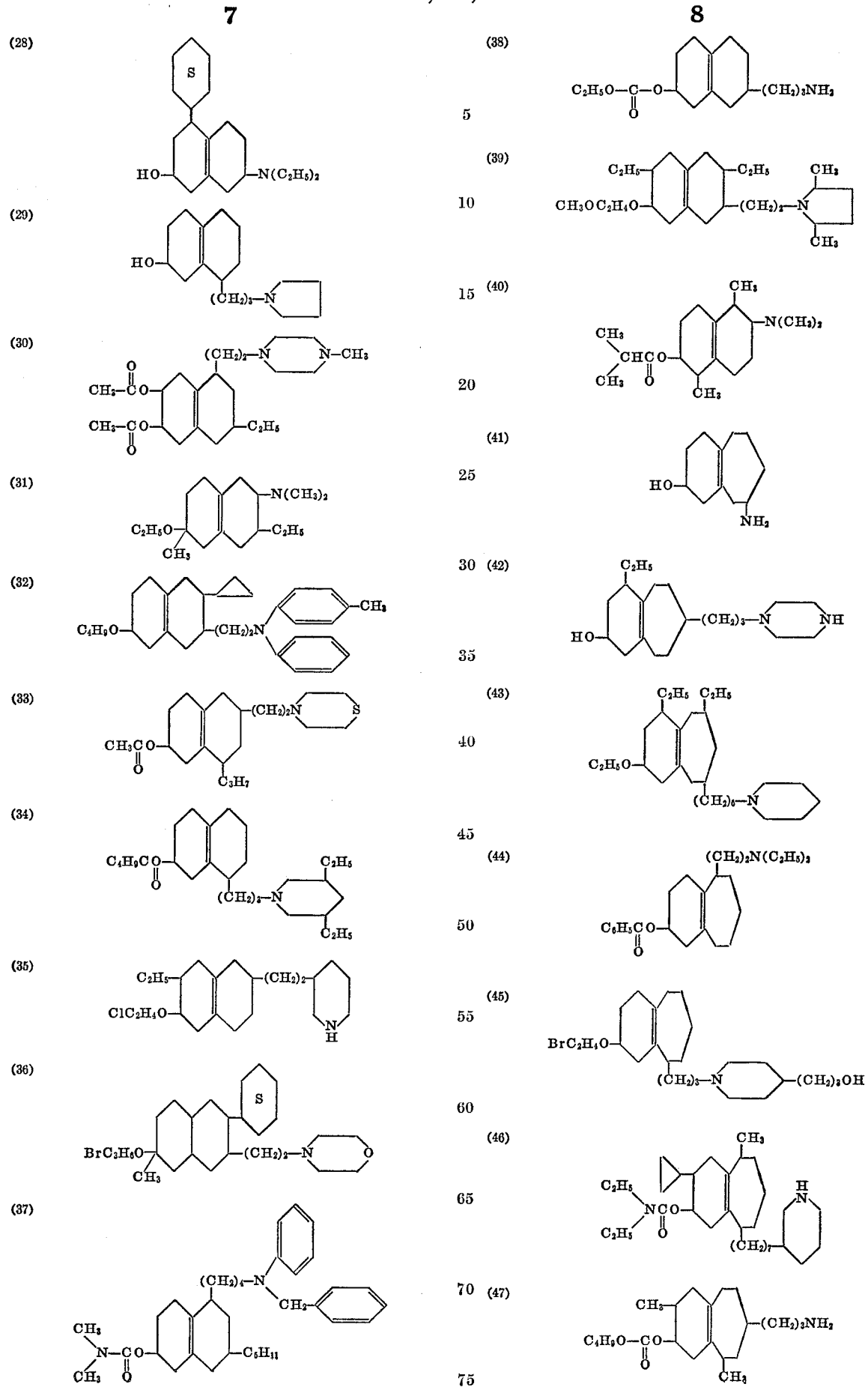

(48) 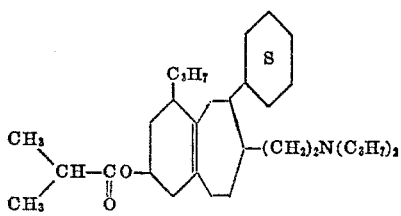

(49) 

(50) 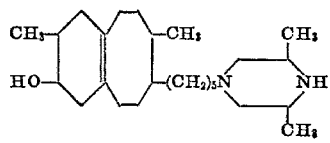

(51) 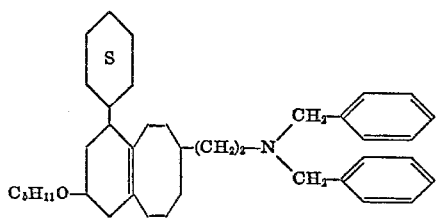

(52) 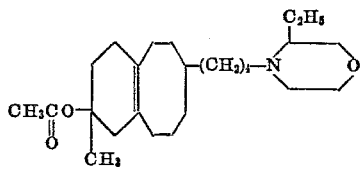

(53) 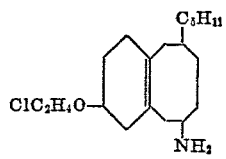

(54) 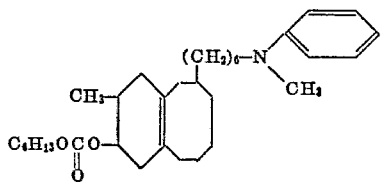

(55) 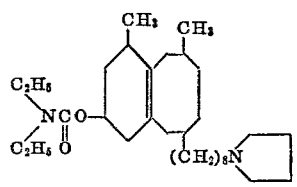

(56) 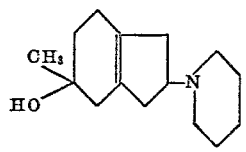

(57) 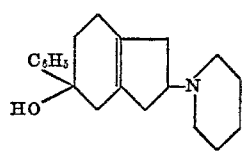

(58) 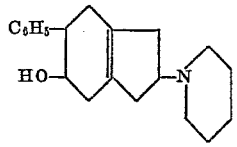

Each of the above structures represent each of the possible isomers as outlined hereinbefore as well as mixtures of such isomers.

The compounds of the invention are useful as analgetic muscle relaxants in mammalian species, for example, rats and dogs. In addition, the compounds of the invention can be employed as antibiotics. A compound of Formula I as well as its physiologically acceptable acid salts may be compounded according to pharmaceutical practice in oral or parenteral dosage forms such as tablets, capsules, elixirs, injectables or powders for administration of about 100 mg. to 400 mg. per day, preferably 125 mg. to 175 mg. per day in 2 to 4 divided doses.

Furthermore, the compounds of this invention are useful as water softeners.

PREPARATION OF COMPOUNDS OF THE INVENTION

Further, in accordance with the present invention, a process is provided for preparing compounds of Formula I wherein —Y represents an amine, which comprises forming a diene of the structure.

(IV) 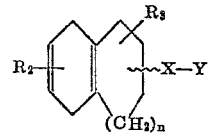

reacting the diene IV with a hydroborating agent such as diborane or substituted boranes in the presence of a suitable nonprotonic solvent, such as tetrahydrofuran, or any of these disclosed hereinbefore, employing a molar ratio of diene IV:diborane of within the range of from about 1:1 to about 0.9:1, at temperatures within the range of from about 0 to about 25° C., after removal of solvent, reacting the residue with an oxidizing agent such as hydrogen peroxide, in the presence of a base such as an alkali metal or alkaline earth metal hydroxide or alkoxide, for example sodium hydroxide, potassium hydroxide, calcium hydroxide or sodium butoxide, while maintaining the reaction mixture at a temperature of at least refluxing temperature to form a compound of the structure (V) 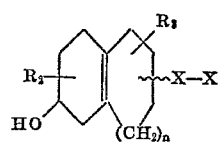

wherein Y is a tertiary amine.

Compound V can be converted to the corresponding monoester wherein $R_1$ is acyl by dissolving the monool V in an organic base, such as pyridine, and treating the solution with an acylating agent such as a hydrocarbon carboxylic acid containing less than twelve carbon atoms, the acid anhydride thereof, or corresponding acyl halide and a catalyst if desired, at a temperature within the range of from about 0 to about 30° C., the acid, acid anhydride or acyl halide being employed in a molar ratio to the monool of within the range of from about 1:1 to about 4:1.

In addition, a process is provided for preparing compounds of Formula I wherein —Y represents a secondary amine, which comprises forming a diene of the structure (VI) 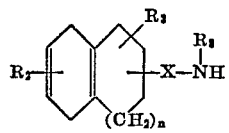

wherein R₈ is lower alkyl, monocyclic aryl or monocycloalkyl, protecting the resulting dieneamine VI with an easily removable group such as benzyl or benzyloxy carbonyl by reacting dieneamine VI with for example, a halide of such groups, for example benzyl chloride, reacting the protected dieneamine with a hydroborating agent such as diborane or substituted borane, in the presence of a suitable nonprotonic solvent such as tetrahydrofuran, benzene, dioxane or ethyl ether, employing a molar ratio of protected diene:diborane of within the range of from about 1:1 to about 0.9:1, at a temperature within the range from about 0 to about 30° C., to form the corresponding monool, and thereafter removing the protecting group, for example, by debenzylating over a catalyst such as palladium on strontium carbonate or carbon to yield a compound of the structure (VII) 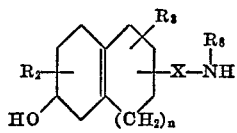

A process is also provided for preparing compounds of Formula I wherein —Y represents a primary amine, which comprises forming a diene of the structure

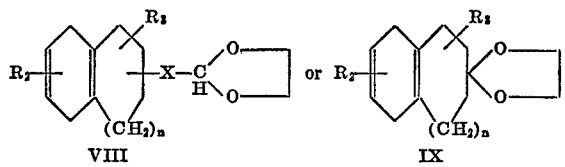

reacting the diene with a hydroborating agent such as diborane or substituted borane, in the presence of a suitable nonprotonic solvent such as tetrahydrofuran, or any of the solvents mentioned hereinbefore, employing a molar ratio of diene:diborane of within the range of from about 1:1 to about 0.9:1, at a temperature within the range of from about 0 to about 30° C. to form the corresponding monool, hydrolyzing the monool by dissolving it in an alcohol such as methanol or ethanol and an acid such as oxalic acid dihydrate or formic acid to form the corresponding aldehyde or ketone of the structure

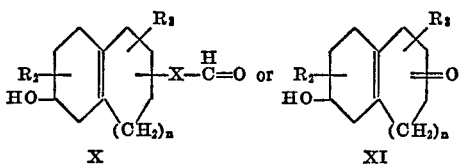

converting compound X or XI to the corresponding oxime by dissolving it in a base such as pyridine, and reacting it with hydroxylamine or the hydrohalide thereof, and thereafter dissolving the oxime in a nonprotonic solvent, such as dioxane or any of these described hereinbefore and treating it with a reducing agent such as lithium aluminum hydride, or other complex metal hydrides in ether, or alternatively the oximes may be reduced catalytically over a noble metal catalyst such as palladium, to form compounds of the structure

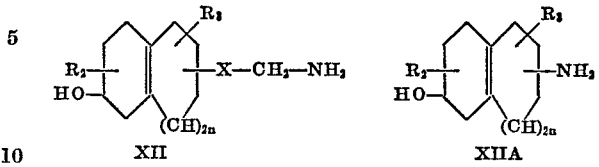
XII         XIIA

Furthermore, primary, secondary or tertiary amines of the invention can be prepared from compounds of the structure (XIII) 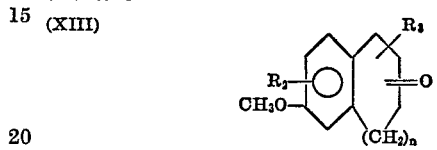

that is methoxy indanones, tetralones and benzosuberanes, wherein the methoxy group is attached to one of the carbon atoms not adjacent to the alicyclic ring, as follows:

Where primary amines are desired, with no X side chain, compound XIII is reacted with hydroxyamine or hydrohalide thereof as described hereinbefore to form the corresponding oxime which is reduced in the presence of an alkali metal reducing agent such as lithium aluminum hydride to form the corresponding amine of the structure (XIV) 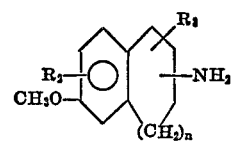

which is employed as a starting material as will be seen hereinafter.

Where secondary or tertiary amines are desired with no X side chain, then compound XIII is reacted with an amine to form the corresponding enamine or imine which is reacted with a reducing agent such as sodium borohydride to form a starting material of the structure (XV) 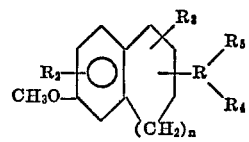

Where side chain amines are desired, compound XIII is reacted with a Wittig-type ylid to give side chain nitriles of the structure (XVI) 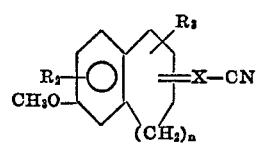

which is then reduced to a primary amine XVII for example by reaction with a reducing agent such as lithium aluminum hydride, (XVII) 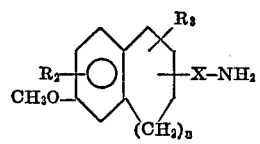

which can be substituted by known procedure to form corresponding secondary or tertiary amines of the structure (XVIII)

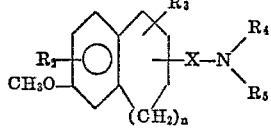

To form the compounds of the invention, the starting material, namely, compound XIV, XV, XVII or XVIII is reduced with, for example, an alkali metal in liquid ammonia in the presence of a proton source such as a lower alkanol to form the corresponding dihydro derivative which is hydrolyzed in the presence of a mild acid catalyst such as oxalic acid to give the corresponding unconjugated ketone of the structure (XIX)

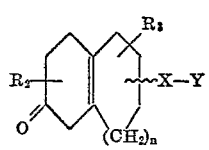

which is reduced with, for example, a complex metal hydride, such as sodium borohydride to the corresponding unsaturated alcohol of the invention.

(XX)

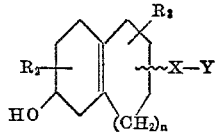

Still further, primary, secondary or tertiary amine compounds of the invention of Formula I can be prepared from phenolic amine compounds of the structure (XXI)

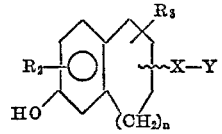

by reducing XXI with, for example, an excess of alkali metal in liquid ammonia in the presence of a proton source such as a lower alkanol.

Another process for preparing the compounds of the invention comprises forming a vicinal trans 4,5-dihydroxy cyclohexene derivative of the structure (XXII)

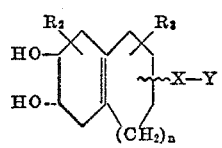

treating XXII with p-toluene sulphonyl chloride or mesyl chloride in a molar ratio of XXII:chloride of within the range of from about 1:1 to about 1.1:1 and preferably about 1:1, in the presence of an organic base, such as pyridine to form a compound of the structure (XXIIa)

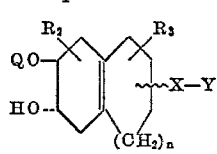

wherein Q is tosyl or mesyl, treating XXIIa with a strong base such as potassium t-butoxide in t-butanol, to form an epoxide of the structure (XXIIb)

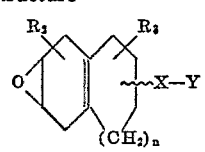

and reducing the epoxide, for example, with a complex metal hydride such as lithium aluminum hydride to form a monoolmonoene amine of the invention.

Epoxide XXIIb can be reacted with Grignard reagent or a lithium reagent such as phenyllithium or derivatives thereof to form compounds of the structure (XXIIc)

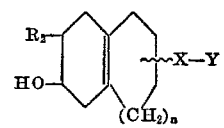

where $R_2$ is alkyl or aryl.

Where tertiary amines are described, compounds of the structure (XXIII)

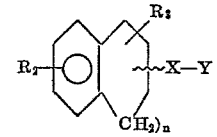

can be reacted with nitric acid to form a nitro derivative of the structure.

(XXIIIa)

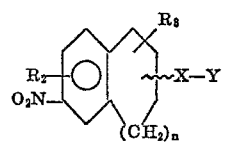

which is reduced, for example, by employing stannous chloride or other reducing agents, to the corresponding amine derivative.

(XXIIIb)

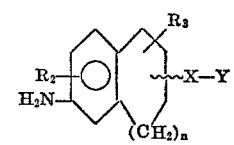

The amine derivative is diazotized, for example, by reaction with sulfuric acid and sodium nitrite to form the monool XXI (XXI)

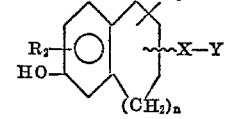

The monool can then be reduced, for example, with an alkali metal in liquid ammonia as described hereinbefore to form the compounds of the invention.

Tertiary amines of the invention can also be formed by reacting compound XXIII with an acylating agent such as an acyl halide or acid anhydride in the presence of aluminum chloride to form a coupound of the structure (XXIV)

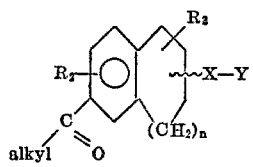

Compound XXIV is converted to its corresponding oxime, for example, by reaction with hydroxylamine, having the structure (XXIVa)

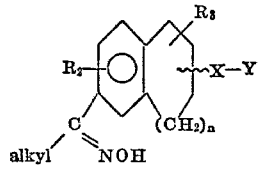

which is reacted with polyphosphoric acid or other suitable acid catalyst to form an amine derivative of the structure.

(XXIVb)

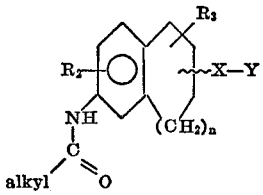

which is hydrolyzed in alcoholic base to form the corresponding amino derivative of structure XXIIIb.

Another method for forming tertiary amines comprises reacting a diene IV in an alkanoic acid containing from about two to about ten carbon atoms with the silver salt of the above acid and iodine to form a compound of the structure (XXIVc)

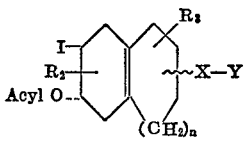

where Y is a tertiary amine, employing a molar ratio of IV:Ag salt of within the range of from about 0.9:1 to about 1.1:1 and a molar ratio of IV:I$_2$ of within the range of from about 0.9:1 to about 1.1:1, and reducing XXIVc with a reducing agent such as lithium aluminum hydride, or hydrogen in the presence of a palladium or platinum catalyst, to form the corresponding monoester of the invention which can be treated with alcoholic base to form the monoolmonoene of the invention.

PREPARATION OF OTHER MONOOL DERIVATIVES

The monool ethers of Formula I wherein R$_1$ is lower alkyl can be prepared by dissolving a monool of Formula I in a suitable nonprotonic solvent such as benzene, dioxane, ethyl ether or tetrahydrofuran, adding to the solution at least one equivalent of a metal hydride such as sodium hydride, or sodium amide, thereafter adding to the mixture slowly with stirring about one equivalent of a lower alkyl halide such as methyl iodide, methyl bromide or ethyl iodide, and maintaining the temperature of the reaction mixture within the range of from about 20 to about 60° C. and preferably from about 30 to about 40° C., to form the monool ether. Thereafter, ethyl alcohol and/or water can be added to decompose excess base, and the monool ether can be recovered by stripping down the organic solvent.

Monools of Formula I wherein R$_1$ is halo-lower alkyl can be formed as described hereinbefore with respect to the preparation of the monool ethers with the exception that an alkylene halohalide (or dihaloalkane) such as trimethylene chlorobromide or pentamethylene fluoro iodide, is employed in place of the alkyl halide.

Monools of Formula I wherein R$_1$ is lower alkoxy carbonyl can be formed as described hereinbefore with respect to the preparation of the monool ethers with the exception that a dialkyl carbamoyl halide, such as dimethyl carbamoyl chloride or diethyl carbamoyl bromide, or a substituted isocyanate such as an alkyl or aryl isocyanate is employed in place of the alkyl halide.

Monools of Formula I wherein R$_1$ is lower alkoxyalkylene wherein the alkylene group contains two to five carbon atoms can be formed as described hereinbefore with respect to the preparation of the monool ethers except that an alkoxyalkylene halide such as ethoxypropyl chloride or ethoxyethyl bromide is employed in place of the alkyl halide.

Monools of Formula I wherein R$_1$ is

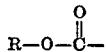

can be formed as described hereinbefore with respect to the preparation of the monool ethers except then an alkylhalo formate such as methylchloroformate or ethylchloroformate is employed in place of the alkyl halide.

Compounds of the invention of the structure (XXIVd)

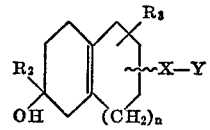

can be prepared by reacting an unconjugated ketone of the structure XIX (XIX)

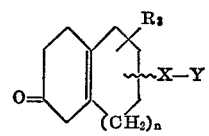

with a Grignard reagent of the structure (XXIVe)      R$_2$MgZ wherein Z is Cl, Br or I in the presence of ether, employing a molar ratio of XXIVd:XXIVe within the range of from about 1:1 to about 5:1.

STARTING MATERIALS

The diene starting material:

(XXV)

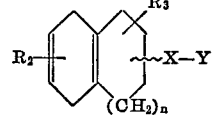

can be prepared by the Birch reduction of an aromatic precursor of the structure:

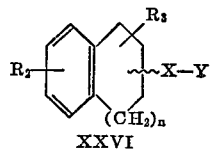

XXVI or

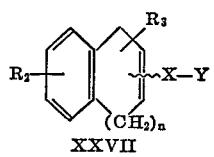

XXVII

An aromatic indenyl precursor of the structure:

(XXVIII)

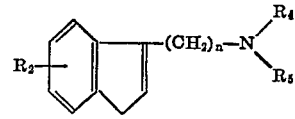

can be prepared by reacting an indene of the structure:

(XXIX)

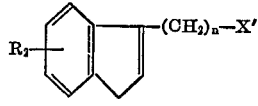

wherein X' is a reactive halogen or other displaceable group such as tosylate and n is 1 to 10, with an amino compound of the structure:

(XXX)

wherein R$_4$ and R$_5$ are as defined hereinbefore, in a molar ratio of indene::amine of within the range of from about 1:2 to about 1:10 and preferably from about 1:2 to about 1:4, at a temperature within the range of from about 75° to about 150° and preferably from about 100° to about 120°, in the presence of a solvent having a boiling point below about 150° C., such as toluene or xylene.

The aromatic indenyl precursors of the structure XXVIII can be converted to the corresponding indanyl compound by reduction employing as a reducing agent, for example, hydrogen, in the presence of a catalyst for reduction, for example, platinum oxide.

The aromatic indenyl compounds of the structure XXVIII can also be prepared by reacting indene with an amino alkylene halide of the structure:

(XXXI)

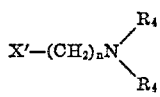

wherein X', n, R$_4$ and R$_5$ are as defined hereinbefore, in the presence of a base, such as a concentrated aqueous solution of an alkaline earth metal hydroxide and Triton B in methanol, at a temperature within the range of from about 40 to about 75° C. and preferably from about 45 to about 55° C. The indene is employed in a molar ratio to halide of within the range from about 1:1 to about 10:1 and preferably from about 2:1 to about 4:1. The base is employed in a molar ratio to halide of within the range of from about 3:1 to about 10:1 and preferably from about 3:1 to about 5:1.

Indenyl compounds of the structure:

(XXXII)

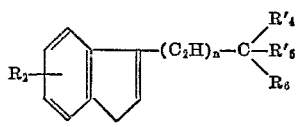

can be prepared by reacting an indene of the structure XXIX, i.e.,

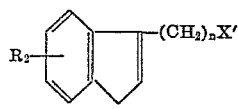

with a compound of the structure:

(XXXIII)

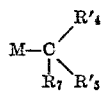

wherein M is an alkali metal, such as sodium or potassium, for example, (XXXIV)

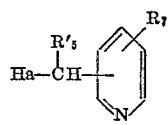

wherein R$_7$ can be any of the R'$_4$ group (molar ratio of indene to metal salt of within the range of from about 1:1 to about 1:10 and preferably from about 1:2 to about 1:4) in the presence of liquid ammonia. The resulting indenyl compound can be reduced to the corresponding indanyl piperidine compound by reacting with hydrogen in the presence of a catalyst for reduction such as platinum oxide.

Indanyl compounds of the structure:

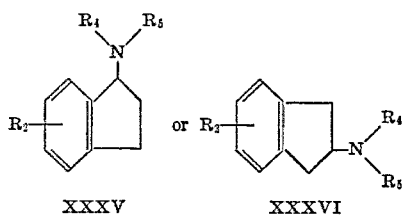

XXXV   XXXVI can be prepared by reacting a 1-indanone or 2-indanone with an amino compound of the structure XXX, i.e.,

(in a molar ratio of indanone:amine of within the range of from about 1:1 to about 1:4 and preferably from about 1:1.1 to about 1:1.5) in the presence of an aromatic solvent boiling below about 150° C. such as toluene or benzene, and p-toluene-sulfonic acid, at a temperature of within the range of from about 80 to about 125° C. and preferably reflux temperature, removing water, solvent and excess amine reactant, dissolving the residue in an alcohol solvent boiling below about 100° C., such as methanol, and adding an alkali metal borohydride, an organic acid, such as acetic acid, to destroy remaining borohydride, and a base, to form the 1 or 2-indanyl compounds of structures XXXV and XXXVI.

Dihydronaphthalene starting materials of the structure:

(XXXVII)

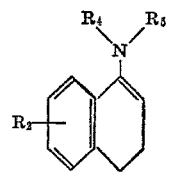

can be prepared by reacting 1-tetralone and an amino compound of the structure XXX, i.e.

(molar ratio tetralone:amine of 1:1.1 to about 1:1.5) in an aromatic solvent boiling below about 150° C., in the presence of p-toluenesulfonic acid, at a temperature within the range of from about 80 to about 140° C. and preferably from about 110 to about 140° C. to form the dihydronaphthalene.

The dihydronaphthalene can be converted to the corresponding tetrahydronaphthyl compound by reducing the salt form of the dihydro compound in the presence of a reducing agent, such as lithium aluminum hydride.

The aromatic precursor, i.e., the compounds of Formulae XXVI and XXVII, respectively, undergo a Birch reduction to form the diene starting material of structure XXV. The Birch reduction is carried out by reacting the aromatic precursor with lithium in a molar ratio to the lithium of within the range of from about 1:2 to about 1:50 and preferably from about 1:10 to about 1:20 in the presence of liquid ammonia, a proton source such as a lower alcohol and ethyl ether as would be apparent to one skilled in the art.

Examples of aromatic starting materials of the structure:

(XXXVIII)

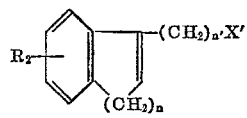

can be seen from Table A, wherein n, n' and X' in the above formula are defined.

TABLE A (a) n'=1, X'=Cl _____ n=1
(b) n'=2, X'=Br _____ n=1
(c) n'=2, X'=I _____ n=2
(d) n'=4, X'=p-CH$_3$C$_6$H$_4$SO$_2$O— _____ n=1
(e) n'=5, X'=Cl _____ n=1
(f) n'=6, X'=Br _____ n=2
(g) n'=7, X'=Cl _____ n=2
(h) n=8, X'=I _____ n=1

Examples of starting materials of the structure:

(XXIX) 

can be seen from Table B wherein $R_4$ and $R_5$ are defined.

TABLE B

| | $R_4$ | $R_5$ |
|---|---|---|
| (a) | —N⟨S⟩N—CH$_3$ | H |
| (b) | CH$_3$— | C$_2$H$_5$ |
| (c) | H | CH$_3$ |
| (d) | C$_4$H$_9$— | C$_5$H$_{11}$— |
| (e) | ⟨S/N⟩ | H |
| (f) | ⟨S⟩ | ⟨S⟩ |
| (g) | ⟨S⟩—CH$_2$— | ⟨S⟩—CH$_2$— |
| (h) | ⟨S⟩ | ⟨S⟩ |
| (i) | CH$_3$ | CH$_3$ |
| (j) | C$_2$H$_5$ | C$_2$H$_5$ |

Examples of starting materials of the structure:

(XL) 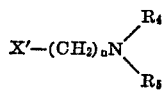

can be seen from Table C wherein X′, n′, $R_4$ and $R_5$ are defined.

TABLE C

| | X′ | n′ | $R_4$ | $R_5$ |
|---|---|---|---|---|
| (a) | Br | 2 | C$_2$H$_5$ | CH$_3$ |
| (b) | Cl | 2 | CH$_3$ | CH$_3$ |
| (c) | Br | 3 | CH$_3$—N⟨S⟩N— | CH$_3$—N⟨S⟩N— |
| (d) | I | 4 | ⟨S⟩—CH$_2$— | ⟨S⟩—CH$_2$— |
| (e) | Cl | 5 | HO—CH$_2$CH$_2$— | HOCH$_2$CH$_2$— |
| (f) | I | 10 | ⟨S⟩ | ⟨S⟩ |

Examples of starting materials of the structure:

(XLI) 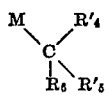

can be seen from Table D wherein M, R′$_4$, R′$_5$ and $R_6$ are defined.

TABLE D

| | M | R′$_4$ | R′$_5$ | $R_6$ |
|---|---|---|---|---|
| (a) | K | C$_2$H$_5$ | C$_2$H$_5$ | H |
| (b) | Na | ⟨S/N⟩ | H | H |
| (c) | Li | ⟨N/S⟩ | ⟨N/S⟩ | H |
| (d) | Na | △ | H | H |
| (e) | K | H | ⟨S/N⟩ | H |
| (f) | Na | ⟨S⟩ | ⟨S⟩ | —CH$_3$ |

ALTERNATIVE METHODS FOR PREPARING NAPHTHYL DERIVATIVES 1,2,3,4,5,8-hexahydronaphthalene of structures XXVA and XXVB

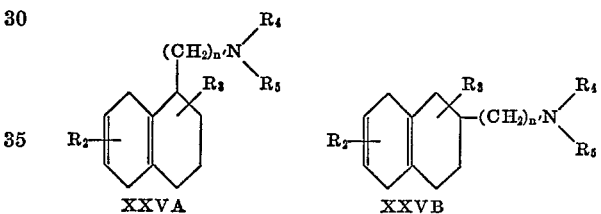

may be prepared from tetralones in several ways known to the art. Reaction of α-tetralone with an aminoalkyl Grignard reagent followed by Birch reduction of the intermediate amino alcohol yields XXVA directly.

2-substituted compounds (namely XXVB) can be prepared from β-tetralone by removing the alcohol group by treatment with acidic reagents such as hydrochloric acid in acetic acid before the Birch reduction. Another method involves reaction of tetralones with a Wittig-type-ylid to give side-chain nitriles which are reduced to primary amines and then substituted by well-known procedures to secondary or tertiary amines. A third process involves the Mannich bases derived from tetralones (i.e. reduction with LiAlH$_4$ followed by Birch reduction yields XXVB n′=1). Alternately quaternization followed by reaction with potassium cyanide or ethyl cyanacetate in the presence of base yields intermediates easily convertible to dihydronaphthalenes containing side-chain amines (i.e. XXVA or XXVB where n′=2 or 3 respectively). These are subjected to Birch reduction as above to yield hexahydronaphthalenes.

The vicinal trans 4,5-dihydroxy cyclohexene derivative XXII employed as a starting material can be prepared by dissolving a diene of the structure (XILI) 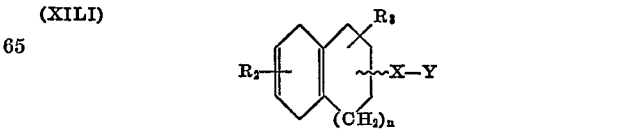

in an organic carboxylic acid having up to about eight carbon atoms, such as acetic acid, treating the mixture with a silver salt corresponding to the acid, such as silver acetate (in a molar ratio of diene to silver salt of within the range of from about 1:2 to about 1:4 and preferably about 1:2) and iodine (in a molar ratio of diene to iodine of 1:1), heating the reaction mixture at a temperature of within the range of from about 60° to about 110° and preferably from about 80° to about 100°, to form a diester (depending on which acid and silver salt are employed) of the structure:

(XLIII)

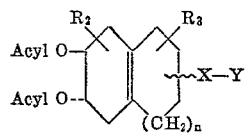

The above diester can be converted to the corresponding diol of Formula XXII by dissolving the diester in a suitable protonic solvent, such as ethyl alcohol, treating the solution with an excess of an aqueous base, such as aqueous sodium hydroxide or potassium hydroxide, to effect hydrolysis to the corresponding diol of the structure:

(XLIIIa)

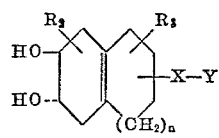

The phenolic amine starting material of structure XXI, that is

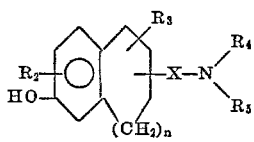

can be prepared by reacting a disubstituted amino or aminoalkyl indane, Tetralin or benzosuberane, for example (XLIV)

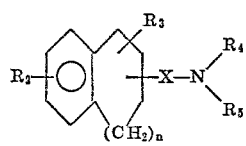

with concentrated sulfuric acid and then with nitric acid at a temperature within the range of from about 5 to about 50° C. to yield a mixture of nitro derivatives which can be separated, for example, by their differential solubility in hexane, the isomer (XLV)

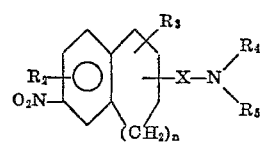

is then reacted with a suitable reducing agent such as stannous chloride (SnCl$_2$) in hydrochloric acid or other acid to form the corresponding amine of the structure (XLVI)

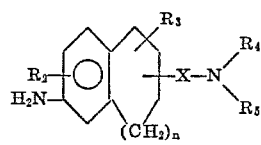

which is then diazotized with, for example, sodium nitrite or nitrous acid in dilute acid such as sulfuric acid or hydrochloric acid and treated with boiling dilute acid to yield the phenolic amine of structure XXI.

The phenolic amine starting material can also be prepared by dissolving a disubstituted amino- or aminoalkyl indane, Tetralin or benzosuberane in a lower acid chloride such as acetyl chloride and treating the mixture with excess aluminum chloride at a temperature within the range of from about 25 to about 100° C. to effect acylation of the aromatic ring and form a compound of the structure (XLVII)

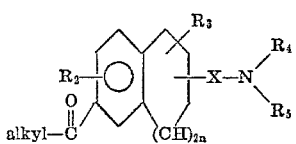

converting XLVII to the corresponding oxime by treatment with hydroxylamine or its hydrochloride in a base such as pyridine, heating the oxime with polyphosphoric acid at a temperature within the range of from about 80 to about 120° C. thereby causing the oxime to undergo a Beckmann rearrangement to form an acylanilide of the structure (XLVIII)

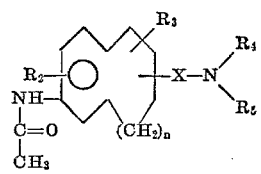

hydrolyzing the acylanilide in dilute base or acid to the free aniline and diazotizing the free aniline with for example sodium nitrite or nitrous acid in dilute acid and treating with boiling dilute acid to form the phenolic amine starting material.

INTERMEDIATES

The phenolic amines of the structure (XXI)

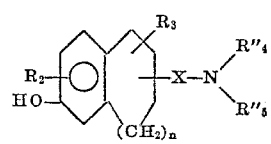

wherein $R_4''$ and $R_5''$ are other than hydrogen and includes any of the other $R_4$ and $R_5$ groups mentioned hereinbefore and $R_2$, $R_3$, $n$, and X are as defined hereinbefore and are novel intermediates. Examples of such phenolic amines includes those having Formula XXI wherein $R_2$, $R_3$, $n$, X, $R_4$ and $R_5$ (other than hydrogen) and the positions of $R_2$, $R_3$ and —X are as set out in the examples of monoolmonoenes disclosed earlier.

The epoxides of the structure XXIIb, that is (XXIIb)

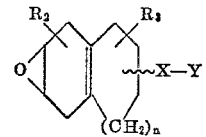

wherein $R_2$, $R_3$, $n$, X and Y are as defined hereinbefore are novel intermediates. Examples of such compounds include those having the Formula XXIIb wherein $R_2$, $R_3$, $n$, —X—Y and the positions of $R_2$, $R_3$ and —X—Y are as set out in examples of monoolmonoenes disclosed hereinbefore.

These epoxides can be treated with an alkanol, such as methanol, in the presence of an acid catalyst such as sulfuric acid or perchloric acid to break open the epoxide and form compounds of the structure (XXIIc)

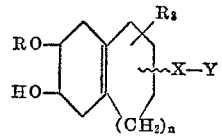

The following examples represent preferred embodiments of the invention.

Example 1.—4,5,6,7-tetrahydro-2-piperidino-5-indanol 1-(4,7-dihydro-2-indanyl)piperidine (19.3 g., 0.093 mole) is dissolved in 200 ml. dry tetrahydrofuran. A solution of 1 M borane in tetrahydrofuran (93 ml.) is added dropwise in 40 minutes. The mixture is left stirring overnight, the solvent is removed in vacuo. The viscous residue is then dissolved in 200 ml. 95% ethanol and 8.0 g. (0.2 M) of sodium hydroxide is added followed by dropwise addition of 30% hydrogen peroxide (24 ml., 0.2 M). After refluxing 2½ hours the mixture is taken to near dryness in vacuo and the residue is extracted four times with ether. The ether extracts are dried over $MgSO_4$ and the ether is removed in vacuo leaving 24.5 g. of oil·GLPC shows two major peaks—one corresponding to starting material and another with twice the retention time.

The oil is then chromatographed on activity grade II neutral alumina. After starting material, product is eluted first with ether then with mixtures of ether plus chloroform up through pure chloroform. All fractions show the same retention time of 5.1 minutes on GLPC using a ⅛″ x 5′ column of OV 17 at 190° C. A total of 10 g. of product (~50%) is thus obtained. A pool of four fractions in the middle of the elution (contents 2.6 g.) is recrystallized from ether-petroleum ether to give 1.6 g., M.P. 94–96° C. I.R. indicates that this pool is a mixture of isomers.

Analysis.—Calcd. for $C_{14}H_{23}NO$ (percent): C, 75.97; H, 10.47; N, 6.33. Found (percent): C, 75.98; H, 10.35; N, 6.17.

Example 2.—4,5,6,7-tetrahydro-2-piperidino-5-indanol. Isomer A

A mixture of isomers is prepared as described in Example 1.

The crude oil (46 g.) is chromatographed on a column of activity grade II neutral alumina (1 kg.). The sample is applied as a hexane-ether (1:1) solution. Two liters of the hexane-ether mixture removes starting material and other faster moving materials. The remaining hexane-ether fractions (1 l.) and the first liter of ether eluate is rich in isomer A (from TLC). These are pooled and the solvent is removed in vacuo yielding 4.6 g. of crystalline material. Two recrystallizations from ether yields 1.9 g. of the title material; M.P. 103–106° C.

Analysis.—Calcd. for $C_{14}H_{23}NO$ (percent): C, 75.97; H, 10.47; N, 6.33. Found (percent): C, 76.14; H, 10.44; N, 6.28.

Example 3.—4,5,6,7-tetrahydro-2-piperidino-5-indanol. Isomer B

After Isomer A is eluted from the mixture of isomers prepared as described in Example 1, the remaining of mixture of isomers is eluted from the alumina column with ether and mixtures of ether and chloroform. After about 2 l. of pure chloroform passes through the column, several fractions (combined vol. 2 l.) which appears on TLC to contain nearly pure Isomer B are collected and pooled. The solvent is removed in vacuo leaving 4.0 g. of crystalline material. Two recrystallizations from ether yield 1.4 g. of the title material; M.P. 113–115° C.

Analysis.—Calcd. for $C_{14}H_{23}NO$ (percent): C, 75.97; H, 10.47; N, 6.33. Found (percent): C, 76.10; H, 10.61; N, 6.25.

Example 4.—4,6,5,7-tetrahydro-2-(piperidinomethyl)-5-indanol, hydrochloride

To a solution of 8.76 g. (0.04 mole) 1-(4,7-dihydro)-2-piperidinomethylindan in 195 ml. tetrahydrofuran under nitrogen at 0° C. is added 59.5 ml. 1 molar diborane in tetrahydrofuran over 40 minutes with stirring. This is stirred overnight in a water bath and under nitrogen. The solution is evaporated, and the residue taken up in 86 ml. 95% ethanol. Sodium hydroxide (3.46 g.) is dissolved in the solution and 10.4 ml. 30% hydrogen peroxide are added slowly with stirring. This solution is refluxed for 2.5 hours, cooled and evaporated to an aqueous solution. This is extracted with ether. The organic layer is dried (magnesium sulfate) and evaporated. The resulting oil is chromatographed with chloroform on a 200 g. basic alumina (activity III) column. The fractions of intermediate polarity are combined, and evaporation yields 2.85 g. (30% crude oily 4,5,6,7-tetrahydro-2-(piperidinomethyl)-5-indanol. This forms a white crystalline hydrochloride (2.5 g., 76%). Recrystallization from isopropanol-ether yields the analytical sample, 1.51 g., M.P. 186–187° C. (dec.).

Analysis.—Calcd. for $C_{15}H_{25}NOHCl$ (percent): C, 66.28; H, 9.65; N, 5.15; Cl, 13.04. Found (percent): C, 66.56; H, 9.85; N, 5.25; Cl, 13.10.

Example 5.—4,5,6,7-tetrahydro-2-piperidino-5-indanol-3,4,5-trimethoxybenzoyl ester 4,5,6,7-tetrahydro - 2 - piperidino-5-indanol prepared as described in Example 1 (2.2 g., ~0.01 M) and 3,4,5-trimethoxybenzoyl chloride (2.4 g., ~0.011 M) are dissolved in 22 ml. pyridine. The mixture is stirred overnight at room temperature. Most of the solvent is then removed in vacuo and the residue is treated with saturated $NaHCO_3$ solution and extracted two times with chloroform. The combined chloroform extract is washed once with saturated $NaHCO_3$ solution and once with water. After drying, the solvent is removed in vacuo leaving a dark brown oil. Most of the oil dissolves in hot hexane. A small amount of dark colored material, which is deposited on cooling is removed. After three months in the cold room the hexane solution yields 2.0 g. (~50%) of near white crystalline material. This is recrystallized from hexane to give the title compound, ~700 mg., shrinking 75°, melting 77–81°.

Analysis.—Calcd. for $C_{24}H_{33}NO_5$ (percent): C, 69.37; H, 8.01; N, 3.37. Found (percent): C, 69.25; H, 8.16; N, 3.33.

EXAMPLES 6 TO 19

Employing the procedure of Example 1, but substituting for the 1-(4,7-dihydro-2-indanyl)piperidine the starting material shown in the left hand column of Table I below, the product shown in the right hand column of Table I is obtained.

TABLE I

| Example No. | Starting material | Product |
|---|---|---|
| 6 | ⟨indane⟩-(CH$_2$)$_3$-N⟨piperidine⟩ | HO-⟨indane⟩-(CH$_2$)$_3$-N⟨piperidine⟩ |
| 7 | ⟨indane⟩-N⟨piperazine⟩NH | HO-⟨indane⟩-N⟨piperazine⟩NH |
| 8 | ⟨indane⟩-(CH$_2$)$_5$-N⟨thiomorpholine⟩S | HO-⟨indane⟩-(CH$_2$)$_5$-N⟨thiomorpholine⟩S |

TABLE I—Continued
| Example No. | Starting material | Product |
|---|---|---|
| 9 | 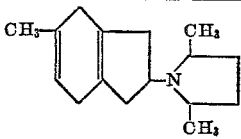 | 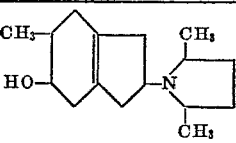 |
| 10 | 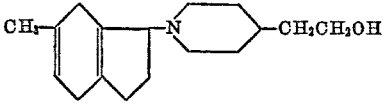 | 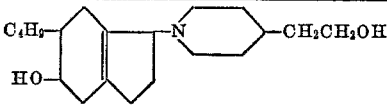 |
| 11 | 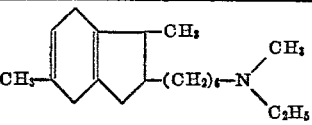 | 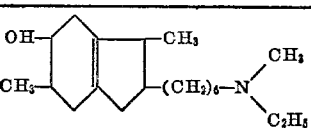 |
| 12 | 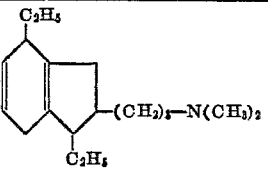 | 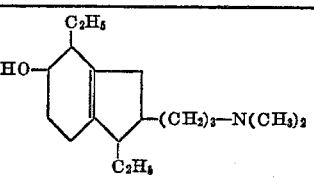 and 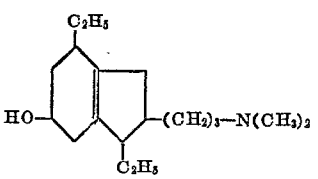 |
| 13 | 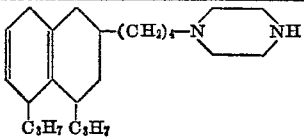 | 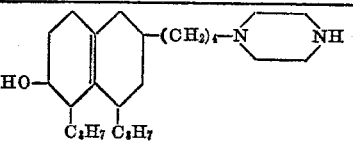 and 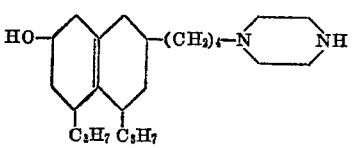 |
| 14 | 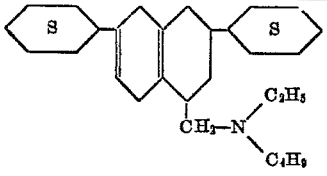 | 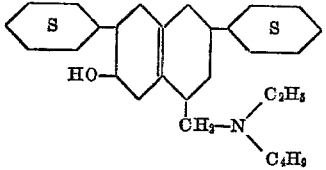 |
| 15 | 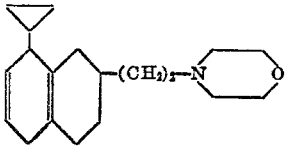 | 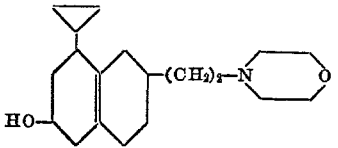 and 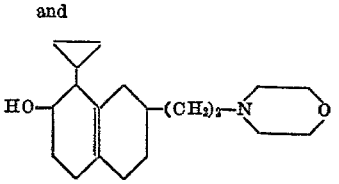 |

TABLE I—Continued

| Example No. | Starting material | Product |
|---|---|---|
| 16 | (structure: bicyclic-(CH₂)₃-N-piperazine-NH) | (structure: HO-bicyclic-(CH₂)₃-N-piperazine-NH) |
| 17 | (structure: C₃H₇, S-phenyl substituted bicyclic-(CH₂)₂-N(C₃H₇)₂) | (structure: HO-substituted bicyclic with C₃H₇, S-phenyl-(CH₂)₂-N(C₃H₇)₂) and (second HO-isomer structure) |
| 18 | (structure: bicyclic-(CH₂)₂-N(CH₂-phenyl)₂) | (structure: HO-bicyclic-(CH₂)₂-N(CH₂-phenyl)₂) and (second HO-isomer structure) |
| 19 | (structure: CH₃-bicyclic-(CH₂)₄-N-morpholine with C₂H₅) | (structure: HO-CH₃-bicyclic-(CH₂)₄-N-morpholine with C₂H₅) |

Example 20.—4,5,6,7-tetrahydro-2-N-butylamino-5-indanol

A mixture of 50 g. of 2-indanone and 55 g. of N-butylamine is mixed in 250 ml. of benzene in the presence of 1 g. of p-toluenesulfonic acid and water is removed azeotropically. The mixture is freed of solvent, and the resulting crude imine is dissolved in 250 ml. of methanol and treated portionwise with 25 g. of $NaBH_4$. After addition the mixture is refluxed for 30 minutes, then cooled, diluted and the product isolated by extraction into ether. After drying, distillation affords 55.6 g. of 2-N-butyl-aminoindan collected at 93–95° (0.1 mm.).

The 55.6 g. of the above compound is dissolved in 2.5 l. of ammonia plus 200 ml. of ether and treated portionwise with 53 g. of lithium ribbon. After addition, ethanol is added dropwise until the color is completely discharged. Removal of ammonia, cooling, dilution with water, and further extraction with ether, followed by drying and solvent removal leaves 54 g. of 4,7-dihydro-2-N-butylamino-indan.

The 54 g. (0.285 mole) of product is dissolved in 500 ml. of toluene, treated with 17.6 g. (0.14 mole) of benzyl chloride and heated under reflux for several hours. The mixture is cooled, filtered, taken to dryness and the residue taken up in ether, washed, dried and freed of solvent leaving 35 g. of 4,7-dihydro-2-N-benzyl - N - butylamino-indan.

The 35 g. of product is dissolved in 750 ml. of tetrahydrofuran and treated with an equivalent amount of a 1 molar solution of diborane in tetrahydrofuran under nitrogen dropwise over 1 hour at 0° C. After stirring overnight in a water bath under nitrogen, the mixture is freed of solvent and the residue taken up in 350 ml. 95% ethanol. The stirred solution is treated with 15 g. of sodium hydroxide in 100 ml. of water and then 42 ml. of 30% hydrogen peroxide is added slowly. After 2 hours at reflux, the mixture is concentrated to an aqueous solution and extracted with ether. The dried ether extracts are evaporated to leave crude 4,5,.6,7-tetrahydro-2-N-benzyl-N-butylamino-5-indanol.

The crude product is dissolved in 200 ml. of absolute ethanol and debenzylated over palladium on charcoal under 50 p.s.i. $H_2$ at room temperature to yield 4,5,6,7-tetrahydro-2-N-butylamino - 2 - indanol which is purified by chromatography on basic alumina followed by crystallization from ether-petroleum ether.

EXAMPLES 21 TO 27

Employing the procedure of Example 20, but substituting for the 2-indanone and N-butylamine, the starting materials shown in Columns 1 and 2, respectively, of Table II below, the product shown in Column 3 is obtained.

TABLE II

| Example No. | Column 1 Ketone | Column 2 | Column 3 Product |
|---|---|---|---|
| 22 | 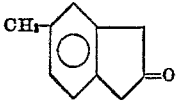 | i-C₃H₇NH₂ |  |
| 23 | 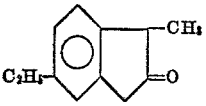 | C₂H₅HN₂ |  |
| 24 | 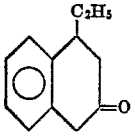 | C₄H₉NH₂ | 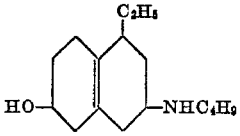 and 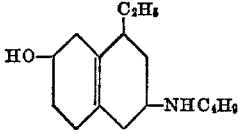 |
| 25 | 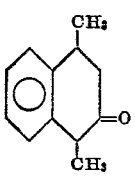 | C₅H₁₁NH₂ | 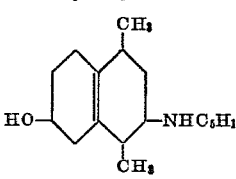 and 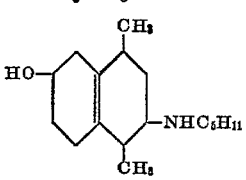 |
| 26 |  | C₂H₅NH₂ | 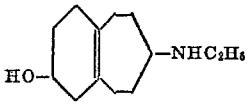 |
| 27 | 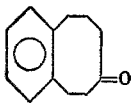 | C₅H₁₁NH₂ | 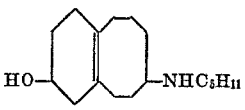 and 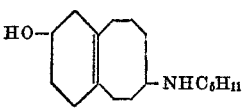 |

EXAMPLES 28 TO 33

Employing the procedure of Example 20, but substituting for the dihydroindan derivative the starting material shown in the left hand column of Table III, the product shown in the right hand column is obtained.

TABLE III

| Example No. | Dihydro starting material | Product |
|---|---|---|
| 28 | 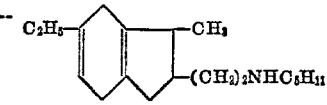 | 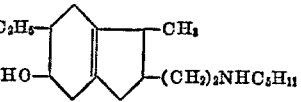 |
| 29 | 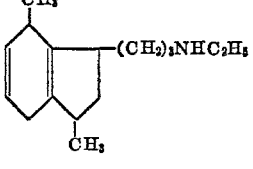 | 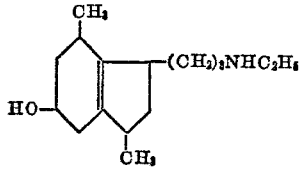 and 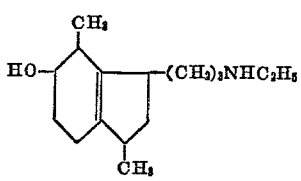 |
| 30 | 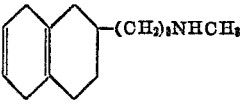 | 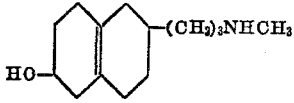 and 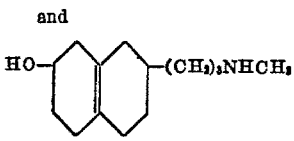 |

TABLE III—Continued

| Example No. | Dihydro starting material | Product |
|---|---|---|
| 31 | CH₃-[ring]-(CH₂)₄NHC₄H₉ | CH₃-[ring]-(CH₂)₄NHC₄H₉, HO- |
| 32 | CH₃-[ring]-(CH₂)₅NHC₂H₅ | HO-[ring]-(CH₂)₅NHC₂H₅, CH₃- |
| 33 | [ring]-(CH₂)₂NHCH₃ | HO-[ring]-(CH₂)₂NHCH₃ and HO-[ring]-(CH₂)₂NHCH₃ |

Example 34.—2-amino-4,5,6,7-tetrahydro-5-indanol hydrochloride

A solution of 22 g. indan-2-spiro-2-dioxolan and 75 ml. of methanol in 1 l. of liquid ammonia is treated portionwise with 20 g. of lithium. After complete addition and color discharge, ammonia is evaporated, ether added and then water added with cooling. Further extraction with ether, drying and distillation affords 16 g. of product collected at 75–80° (0.1 mm.).

A solution of 8.9 g. (0.05 mole) of the above product in 200 ml. tetrahydrofuran under nitrogen at 0° C. is treated dropwise over 1 hour with 0.05 mole of diborane (1 molar in tetrahydrofuran) solution. After stirring overnight in a water bath under nitrogen, the mixture is freed of solvent and the residue taken up in 100 ml. of 90% ethanol. The stirred solution is treated with 5 g. of sodium hydroxide in 25 ml. of water and then 12.5 ml. of 30% hydrogen peroxide added slowly. After 2 hours at reflux, the mixture is evaporated to an aqueous solution and the product extracted into ether. After drying, solvent removal leaves crude 4,5,6,7-tetrahydro-5-hydroxyindan-2-spiro-2'-dioxolan.

The above crude product is dissolved in 250 ml. of methanol plus 25 ml. of water and 2.5 g. of oxalic acid dihydrate and stirred at room temperature until hydrolysis to the ketone is complete. The solution is then concentrated in vacuo and diluted with water. The product is extracted into ether, dried, and freed of solvent.

The crude 4,5,6,7-tetrahydro-5-hydroxy-2-indanone is converted to the oxime by dissolving it in 50 ml. of pyridine, adding an equal weight of hydroxylamine hydrochloride and warming on the steam bath for three hours. The mixture is poured onto ice-water and the product extracted into chloroform, dried, and freed of solvent.

The oxime is dissolved in 50 ml. of dioxane and added to a suspension of 5 g. lithium aluminum hydride in 150 ml. of ether with stirring. After four hours under reflux, the mixture is decomposed with potassium carbonate solution and filtered. Evaporation of the filtrates leaves 2-amino-4,5,6,7-tetrahydro-5-indanol which is purified as its hydrochloride salt.

EXAMPLES 35 TO 42

Employing the procedure of Example 34, but substituting for the dioxolan shown in the left hand column of Table IV, the product shown in the right hand column is obtained.

TABLE IV

| Example No. | Starting material | Product |
|---|---|---|
| 35 | CH₃-[ring]-CH₃, dioxolan | CH₃-[ring]-CH₃, HO-, NH₂ |
| 36 | [ring]-(CH₂)₂-CH(dioxolan) | HO-[ring]-(CH₂)₂CH₂NH₂ |
| 37 | [ring]-(dioxolan) | HO-[ring]-NH₂ and HO-[ring]-NH₂ |

TABLE IV—Continued

| Example No. | Starting material | Product |
|---|---|---|
| 38 | CH₃–[naphthalene]–(CH₂)₃CH(O-CH₂CH₂-O) | HO–[decalin]–CH₃, –(CH₂)₃–CH₂NH₂ |
| 39 | [naphthalene]–C(O-CH₂CH₂-O) | HO–[decalin]–NH₂ |
| 40 | [naphthalene]–(CH₂)₂–C(O-CH₂CH₂-O) | HO–[decalin]–(CH₂)₂–CH₂NH₂ |
| 41 | [naphthalene]–C(O-CH₂CH₂-O) | HO–[decalin]–NH₂ and HO–[decalin]–NH₂ |
| 42 | [naphthalene]–(CH₂)₃–C(O-CH₂CH₂-O) | HO–[decalin]–(CH₂)₃CH₂NH₂ and HO–[decalin]–(CH₂)₃CH₂NH₂ |

Example 44.—6-hydroxy-1,2,3,4,5,6,7,8-octahydronaphthalene

A mixture of 19.1 g. (0.01 mole) of 1-aminomethyl-6-methoxytetralin and 50 ml. of t-butanol in 500 ml. of liquid ammonia is treated portionwise with 5 g. of lithium over 1 hour. After several hours stirring, the mixture is freed of ammonia, diluted with water and extracted with ether. After dying, the resulting 1-aminomethyl-5,8-dihydro-6-methoxytetralin is freed of solvent and is dissolved in 250 ml. of methanol plus 25 ml. of water, stirred and treated with a slight molar excess of oxalic acid. When hydrolysis is complete, the mixture is neutralized and treated portionwise with 10 g. of sodium borohydride. After stirring for 3 hours the mixture is diluted with water and the product extracted into ether, dried and freed of solvent. The resulting 2-aminomethyl-6-hydroxy-1,2,3,4,5,6,7,8,-octahydronaphthalene is purified as its hydrochloride salt.

EXAMPLES 45 TO 52

Employing the procedure of Example 44, but substituting the dihydro starting material shown in the left hand column of Table V, the product shown in the right hand column is obtained.

TABLE V

| Example No. | Starting material | Product |
|---|---|---|
| 45 | CH₃O–[decalin]–NH₂ | HO–[decalin]–NH₂ |
| 46 | CH₃O–[decalin]–(CH₂)₃N(CH₃)₂ | HO–[decalin]–(CH₂)₃N(CH₃)₂ |
| 47 | CH₃–, CH₃O–[decalin]–NH₂ | CH₃–, HO–[decalin]–NH₂ |

TABLE V—Continued

| Example No. | Starting material | Product |
|---|---|---|
| 48 | 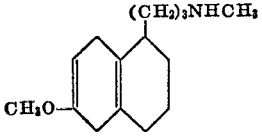 | 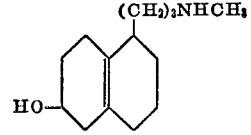 |
| 49 | 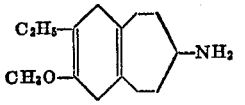 |  |
| 50 | 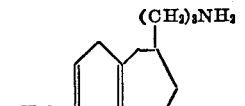 | 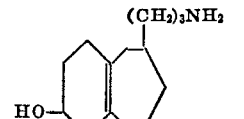 |
| 51 | 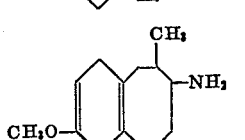 | 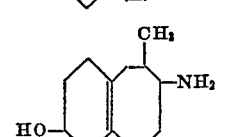 |
| 52 | 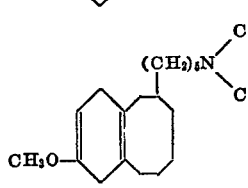 | 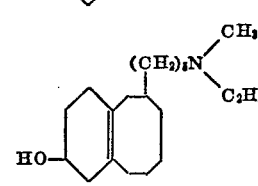 |

Example 53.—4,5,6,7-tetrahydro-2-piperidino-5-indanol

To a cold solution of 20 g. (0.10 mole) of 2-piperidino indan in 50 ml. conc. sulphuric acid is added with stirring 0.11 mole-equivalent of nitric acid at 0–5° C. After stirring cold for 1 hr. the mixture is allowed to come to room temperature and poured onto cracked ice. The resulting mixture is rendered basic with caustic soda and the mixture of products isolated by extraction into benzene. Removal of solvent leaves a residue which is extracted repeatedly with hexane. Evaporation of the hexane extracts leaves the desired 5-nitro-2-piperidino indan (7.5 g.) M.P. 80–84° from alcohol-water. The above nitro compound is dissolved in conc. HCl, added to an excess of stannous chloride in conc. HCl and ultimately heated on the steam bath to complete the reduction. After cooling, the mixture is rendered strongly basic with caustic and the product extracted into ether. After drying, removal of ether leaves 5-amino-2-piperidino indan M.P. 137–139° from alcohol-water (nearly quantitative under yield).

The above amino compound is dissolved in dilute sulphuric acid, cooled to 0–5° C. and treated with 1.1 equivalents of sodium nitrite. After diazotization is complete, the cold solution is added dropwise to a stirred, boiling 5% sulphuric acid solution. After cooling, the product is isolated by adjustment of the pH with $K_2CO_3$ which precipitates the product.

On recrystallization from ethyl acetate the desired 5-hydroxy-2-piperidino indan is obtained, M.P. 246–247.

The above phenol is dissolved in ether and added to liquid ammonia. To the resulting mixture is added 40 equivalents of lithium ribbon in small pieces over 15–30 minutes. The stirred mixture is then treated slowly dropwise with absolute ethanol until all color has discharged. After ammonia has evaporated, the cold mixture is treated with water and the product extracted into ether. After drying and solvent removal, there is obtained 4,5,6,7-tetrahydro-2-piperidino-5-indanol which is purified by chromatography on basic alumina.

Example 53a.—5-amino-2-piperidino indan

A solution of 25 g. (0.125 mole) of 2-piperidino indan in 50 ml. of acetyl chloride is prepared and stirred cold while 100 g. of aluminum chloride is gradually added. The resulting complex is then warmed, ultimately on the steam bath under reflux for 1 hour. The reaction mixture is then carefully decomposed with cracked ice. Basification and extraction with chloroform affords crude 5-acetyl-2-piperidino indan, M.P. 84–86° from alcohol-water. The above ketone is converted to its oxime with $NH_2OH \cdot HCl$ in refluxing pyridine. The crude dried oxime is added portionwise to polyphosphoric acid and heated to 110° for 1 hour. The mixture is poured onto ice and the whole basified. Extraction with chloroform, drying and solvent removal leaves 5-acetylamino-2-piperidino indan, M.P. 114–119° from ethanol-water. Hydrolysis of the above acetylamino compound in alcoholic base affords 5-amino-2-piperidino indan, M.P. 137–139° which can be employed as in Example 53 to form 4,5,6,7-tertahydro-2-piperidino-5-indanol.

EXAMPLES 54 TO 62

Employing the procedure of Example 53, but substituting the starting material shown in the left hand column of Table VI below, the product shown in the right hand column of Table VI is obtained.

TABLE VI

| Example No. | Starting material | Product |
|---|---|---|
| 54 | 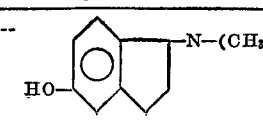 | 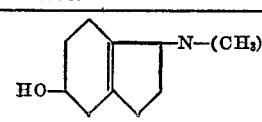 |

TABLE VI—Continued

| Example No. | Starting material | Product |
|---|---|---|
| 55 | (4-methyl-7-hydroxy-indene with 4-methylpiperazine at 1-position) | (corresponding tetrahydro derivative) |
| 56 | (methyl, hydroxy-indene with N(C₂H₅)(CH₃)) | (tetrahydro derivative) |
| 57 | (hydroxy-indene with pyrrolidine) | (tetrahydro derivative) |
| 58 | (methyl, hydroxy-indene with N(CH₃)(C₄H₉)) | (tetrahydro derivative) |
| 59 | (hydroxy-benzocycloheptene with N(C₂H₅)(C₃H₇)) | (tetrahydro derivative) |
| 60 | (hydroxy-indene with piperidine) | (tetrahydro derivative) |
| 61 | (dimethyl, hydroxy-benzocycloheptene with N(C₂H₅)₂) | (tetrahydro derivative) |
| 62 | (hydroxy-benzocycloheptene with piperidine) | (tetrahydro derivative) |

Example 63.—4,5,6,7-tetrahydro-2-piperidino-5-indanol

A solution of 50.5 g. (0.25 mole) of 4,7-dihydro-1-indanyl piperidine in 1 liter of dry acetic acid (fresh bottle) is prepared and treated with 83.5 g. (0.50 mole) of dry silver acetate under $N_2$. The stirred suspension is then treated portionwise with 62.75 g. (0.25 mole) $I_2$ over ½ hr. The stirred mixture is then heated to 90–95° for 3 hours, cooled, filtered and taken to dryness. The residue, which is identified as 5,6-trans-4,5,6,7-tetrahydro-2-piperidino-5,6-indandiol diacetate, is dissolved in 250 ml. methanol and treated with 50 ml. 50% NaOH with stirring. After stirring overnight, the solution is diluted with water and the product extracted into $CHCl_3$. After drying and solvent removal, the crude product is taken up in hot isopropyl alcohol and the solution rendered turbid with ether. A 25 g. first crop is obtained. Further crops of 12 g. are obtained on rework. Total crude yield is 37 g. (63%), M.P. 149–167°. IR indicates the absence of the cis isomer. Recrystallization of 6.0 g. of first crop material twice from benzene provides 2.8 g. of 5,6-trans-dihydroxy - 4,5,6,7 - tetrahydro-2-N-piperidino indan 156–157.5°.

Analysis.—Calcd. for $C_{14}H_{23}NO_2$ (percent): C, 70.85; H, 9.77; N, 5.90. Found (percent): C, 70.66; H, 9.75; N, 5.94.

To a solution of 23.7 g. (0.10 mole) of 5,6-trans-dihydroxy-4,5,6,7-tetrahydro-2-N-piperidino indan in 100 ml. of pyridine cooled to 5° C. is added dropwise a solution of 19.1 g. (0.10 mole) of p-toluenesulphonyl chloride in 50 ml. of pyridine. After stirring overnight in the cold, the mixture is poured into ice-water, basified and extracted with chloroform. The extracts are washed, dried and freed of solvent.

The crude monotosylate is dissolved in 50 ml. t-butanol and added to a mixture of potassium t-butoxide in t-butanol formed from 0.2 mole of potassium and 200 ml. t-butanol. After stirring for several hours at 30–40° C., the mixture is concentrated in vacuo and diluted with water. Extraction with ether, drying and removal of solvent leaves crude 5,6-epoxy-4,5,6,7-tetrahydro-2-N-piperidino indan.

The above epoxide is dissolved in ether and added to a stirred suspension of 10 g. of lithium aluminum hydride in 250 ml. of ether. After overnight reflux, the mixture is decomposed with potassium carbonate solution and filtered. Removal of solvent leaves crude 4,5,6,7-tetrahydro-2-piperidino-5-indanol which is purified by chromatography on basic alumina.

EXAMPLES 64 AND 70

Employing the procedure of Example 63, but substituting the diol starting material shown in column 1 of Table VII, the intermediate epoxide shown in column 2 and the product shown in column 3 are obtained.

TABLE VII
| Example No. | Column 1 Starting material | Column 2 Epoxide intermediate | Column 3 Product |
|---|---|---|---|
| 64 | 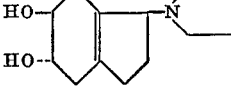 | 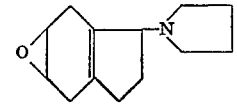 |  and 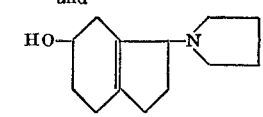 |
| 65 | 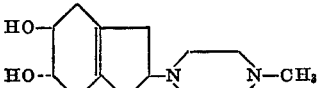 | 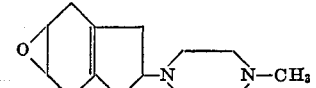 | 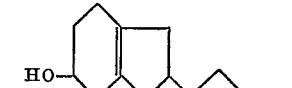 |
| 66 | 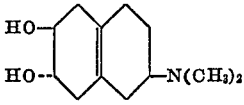 | 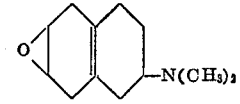 |  and 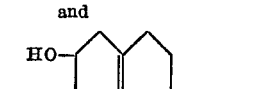 |
| 67 | 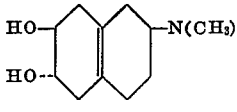 | 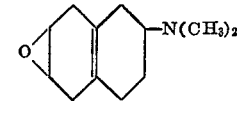 | 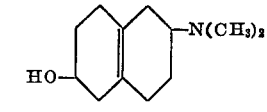 and 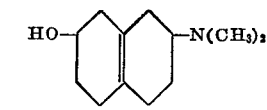 |
| 68 | 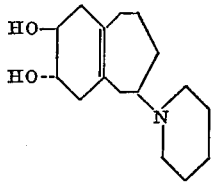 | 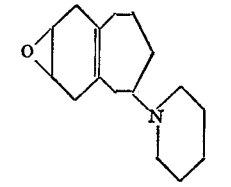 | 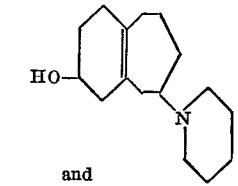 and 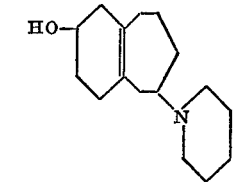 |
| 69 | 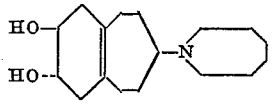 | 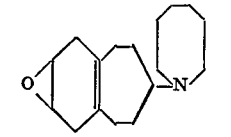 |  |
| 70 | 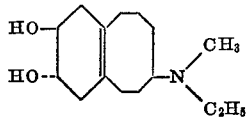 | 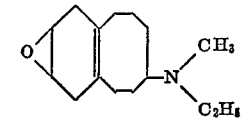 |  and 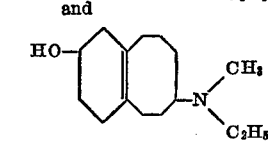 |

EXAMPLE 71

To a cold solution of 1.0 mole phenyl magnesium bromide in ether is added 0.5 mole of 5,6-epoxy-4,5,6,7-tetrahydro-2-N-piperidino indan in ether. The resulting solution is stirred under reflux for 3 hours, then cooled and decomposed with saturated ammonium chloride solution. After separation of the organic layer and removal of solvent, there remains crude 6-phenyl-4,5,6,7-tetrahydro-2-N-piperidino-5-indanol, which is purified by chromatography on basic alumina.

Example 72.—4,5,6,7-tetrahydro-5-phenyl-2-piperidino-5-indanol

A solution of 22.1 g. (0.10 mole) of 4,5,6,7-tetrahydro-2-piperidino-5-indanol is dissolved in 150 ml. of dry pyridine, cooled to 5–10° C. and treated dropwise with slightly more than an equivalent of chromium trioxide in pyridine. After removal of most of the pyridine in vacuum, the residual liquid is diluted with water and the desired ketone extracted into chloroform. After removal of solvent, the crude ketone is dissolved in 250 ml. of ether.

The above solution is added dropwise to an ice-cold stirred solution of 0.5 mole of phenylmagnesium bromide in 1 l. of ether. After stirring for several hours, the mixture is decomposed with saturated ammonium chloride solution and the organic layer separated and dried. Chromatography of the residue obtained on removal of solvent on Alumina III affords the desired product as an oily mixture of isomers.

EXAMPLES 72A TO 77

Following the procedure of Example 71 but substituting as the indanol starting materials, the products of Examples 54, 57 to 60 and 62 shown in column 1 of Table VIII below, the ketone shown in column 2 is obtained; substituting the Grigard reagent shown in column 3, the product shown in column 4 is obtained.

TABLE VIII

| Example No. | Column 1 (Example prepared) | Column 2 $R_3$, $n$, $X$, $Y$ | Column 3 $R_2MgZ$ | Column 4 $R_2$ | Column 4 $R_3$, $n$, $X$, $Y$ |
|---|---|---|---|---|---|
| 72a | HO—[indane]—NH₂ (Example 54) | As per Column 1 | $CH_3MgI$ | $CH_3$ | As per Column 1 |
| 73 | HO—[indane]—N(pyrrolidine) (Example 57) | As per Column 1 | $C_2H_5MgBr$ | $C_2H_5$ | As per Column 1 |
| 74 | HO—[indane with $CH_3$]—NHCH₃ (Example 58) | As per Column 1 | $CH_3$—C₆H₄—MgBr | $CH_3$—C₆H₄— | As per Column 1 |
| 75 | HO—[indane] (Example 59) | As per Column 1 | $C_4H_9MgI$ | $C_4H_9$ | As per Column 1 |
| 76 | HO—[indane]—N(piperidine) (Example 60) | As per Column 1 | $C_3H_7MgBr$ | $C_3H_7$ | As per Column 1 |
| 77 | HO—[indane]—N(piperidine) (Example 62) | As per Column 1 | o-$CH_3O$—C₆H₄MgBr | o-$CH_3OC_6H_4$ | As per Column 1 |

Example 78.—4,5,6,7-tetrahydro-2-piperidino-5-indanol

A solution of 50.5 g. (0.25 mole) of 4,7-dihydro-2-indanyl piperidine in 1 l. of dry acetic acid is prepared and treated with 41.8 g. (0.25 mole) of dry silver acetate under N₂. The stirred suspension is then treated portionwise with 62.8 g. (0.25 mole) I₂ over ½ hour at 20–25°. After stirring for 3 hours longer at this temperature, the mixture is freed of solvent employing a vacuum at below 30°. The residue is taken up in 500 ml. dioxane and added dropwise to a stirred suspension of 37 g. (1.0 mole) of lithium aluminum hydride in 1.5 l. of ether. After stirring under reflux for several hours, the mixture is decomposed by the dropwise addition of saturated $K_2CO_3$ solution and filtered. Evaporation of the organic filtrates leaves crude 4,5,6,7-tetrahydro-2-piperidino-5-indanol which is purified by chromatography on basic alumina.

EXAMPLES 79 TO 83

Following the procedure of Example 80 but substituting the dihydro-indanyl compound shown in column 1 of Table IX, for 4,7-dihydro-2-indanyl piperidine, the product shown in column 2 is obtained.

What is claimed is:
1. A compound of the formula:

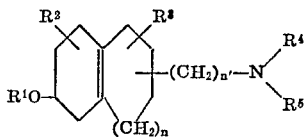

wherein $n$ is selected from the group consisting of 0, 1, 2 and 3; $n'$ is selected from the group consisting of 0, 1 and 2; $R^1$ is selected from the group consisting of hydrogen and alkanoyl of from one to five carbon atoms; $R^2$ is selected from the group consisting of hydrogen and alkanoyloxy of from one to five carbon atoms; $R^3$ is selected from the group consisting of hydrogen and lower alkyl and $R^4$ and $R^5$ are selected from the group consisting of lower alkyl, phenethyl and benzyl or taken together is selected from the group consisting of tetramethylene, pentamethylene and hexamethylene and acid salts, thereof.

2. Compounds in accordance with claim 1 wherein each of $R_1$, $R_2$, and $R_3$ is hydrogen.

3. A compound in accordance with claim 1 having the structure

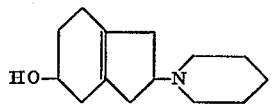

4. A compound in accordance with claim 1 having the structure

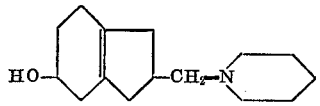

5. A compound in accordance with claim 1 having the structure

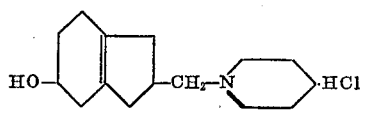

6. A compound having the structure

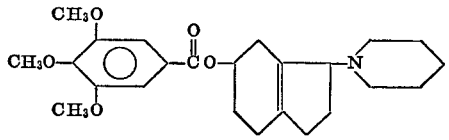

References Cited

Plattner et al.: Helv. Chim. Acta 30, 1091–1100 (1947).

HENRY R. JILES, Primary Examiner
G. T. TODD, Assistant Examiner

U.S. Cl. X.R.

260—239 B, 239 BF, 243 B, 247.2 B, 247.7 E, 268 BC, 326.3, 326.5 C, 340.5, 348 C, 463, 465 F, 473 R, 477, 482 C 490, 562 R, 563 P, 570.5, 571, 586 R, 598, 999

UNITED STATES PATENT OFFICE
CERTIFICATE OF CORRECTION

Patent No. 3,751,420          Dated   August 7, 1973

Inventor(s)  Frederick P. Hauck, Joseph E. Sundeen, and Joyce A. Reid

It is certified that error appears in the above-identified patent and that said Letters Patent are hereby corrected as shown below:

Column 1, line 24, "COMPOUND OF THE INVENTION" should read --COMPOUNDS OF THE INVENTION--.

Column 1, line 25, "monoolmonone" should read --monoolmoneene--.

Column 1, lines 36-38, a comma should follow "(RO$\overset{O}{\underset{\|}{C}}$-)".

Column 1, line 47, there should be a comma (,) between "cycloalkyl" and "X".

Column 1, line 62, "N,N-dialkyl sulfamyl" should read --N,-N-dialkyl sulfamoyl--.

Column 2, lines 61-64, the formula " 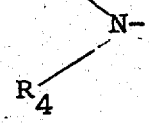 "

should read -- 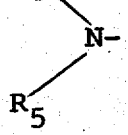 --.

Column 3, lines 19-23, the formula " 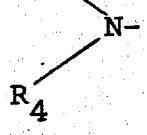 "

should read -- 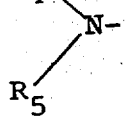 --.

UNITED STATES PATENT OFFICE
CERTIFICATE OF CORRECTION

Patent No. 3,751,420          Dated   August 7, 1973

Inventor(s) Frederick P. Hauck, Joseph E. Sundeen, and Joyce A. Reid

It is certified that error appears in the above-identified patent and that said Letters Patent are hereby corrected as shown below:

Column 3, lines 74 and 75, delete "[e.g., 3-ethylthiamorpholinyl]; di(lower alkyl)thiamorpholinyl".

Column 4, line 13, "production" should read --product--.

Column 5, formula 7, "(H$_2$)$_4$" should read --(CH$_2$)$_4$--.

Column 7, formula 36, should read --

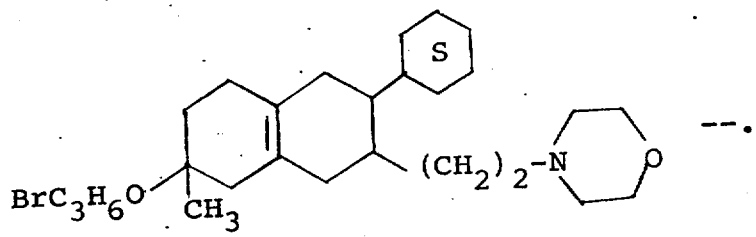

Column 9, formula 52, should read --

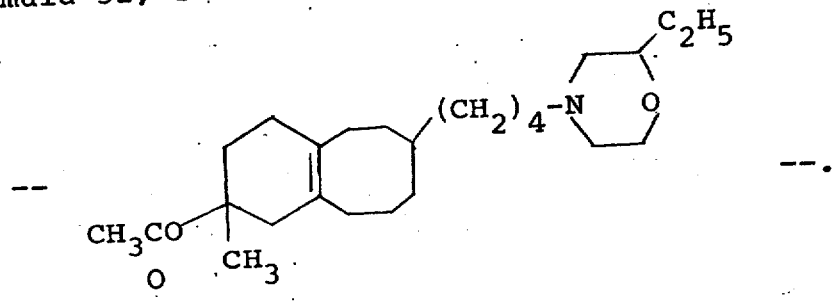

Column 10, line 30, delete the period (.) after "structure".

Column 12, line 26, "hydroxyamine" should read --hydroxylamine--.

Column 13, last formula, "(XXIb)" should read --(XXIIb)--.

Column 16, line 71, "indene::amine" should read --indene:amine--.

UNITED STATES PATENT OFFICE
CERTIFICATE OF CORRECTION

PAGE - 3

Patent No. 3,751,420          Dated August 7, 1973

Inventor(s) Frederick P. Hauck, Joseph E. Sundeen, and Joyce A. Reid

It is certified that error appears in the above-identified patent and that said Letters Patent are hereby corrected as shown below:

Column 17, line 2, "precursors" should read --precursor--.

Column 17, structure (XXXII), "($C_2H$)" should read --($CH_2$)--.

Column 17, structure (XXXIV), "Ha" should read --Na--.

Column 17, line 57, "group" should read --groups--.

Column 19, line 3, "(XXIX)" should read --(XXXIX)--.

Column 19, structure (XL), should read --

--.

Column 20, lines 47 and 48, "Wittig-type-ylid" should read --Wittig-type ylid--.

Column 20, line 64, "(XILI)" should read --(XLII)--.

Column 21, line 35, "Tetralin" should read --tetralin--.

Column 22, structure (XLVIII), should read --

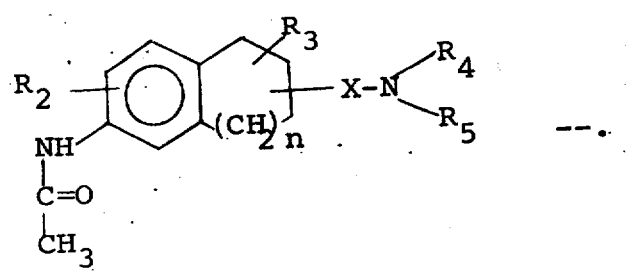

--.

Column 22, line 42, "includes" should read --include--.

Column 24, line 4, example 4, "4,6,5,7" should read --4,5,6,7--.

CERTIFICATE OF CORRECTION

Patent No. 3,751,420                    Dated August 7, 1973

Inventor(s) Frederick P. Hauck, Joseph E. Sundeen, and Joyce A. Reid

It is certified that error appears in the above-identified patent and that said Letters Patent are hereby corrected as shown below:

Table II, column 2, example no. 23, "$C_2H_5HN_2$" should read --$C_2H_5NH_2$--.

Column 33, example 44, line 51, "dying" should read --drying--.

Column 34, example 44, line 47, "2-aminomethyl-" should read --1-aminomethyl---.

Table VI, example 54, the structure under "Starting material" should read--

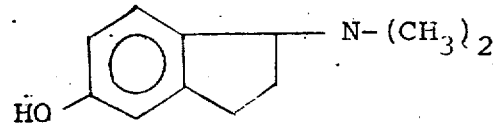

Column 42, line 14, "Grigard" should read --Gringard--.

Table VIII, column 4, example 77, should read --O-$CH_3OC_6H_5$--.

Column 43, Table IX, column 2, example 83, the last structure should be --

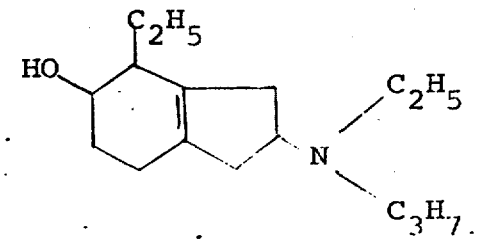

CERTIFICATE OF CORRECTION

Patent No. 3,751,420      Dated Aug. 7, 1973

Inventor(s) Frederick P. Hauck, Joseph E. Sundeen, Joyce A. Reid

It is certified that error appears in the above-identified patent and that said Letters Patent are hereby corrected as shown below:

Claim 6, formula should read

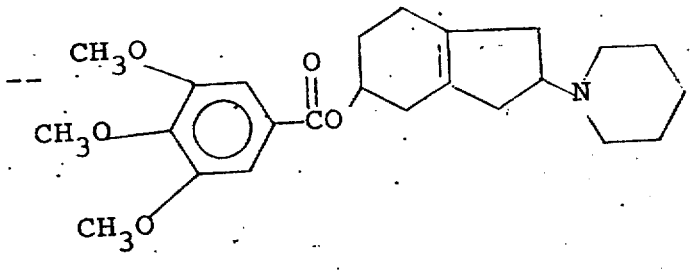

Signed and sealed this 1st day of January 1974.

(SEAL)
Attest:

EDWARD M. FLETCHER, JR.
Attesting Officer

RENE D. TEGTMEYER
Acting Commissioner of Patents